Sept. 10, 1963     S. EPSTEIN     3,103,420
FILM DRIER

Filed Nov. 19, 1959     20 Sheets-Sheet 1

SAMUEL EPSTEIN
INVENTOR.

BY
ATTORNEY

SAMUEL EPSTEIN
INVENTOR.

Sept. 10, 1963     S. EPSTEIN     3,103,420
FILM DRIER
Filed Nov. 19, 1959     20 Sheets-Sheet 5
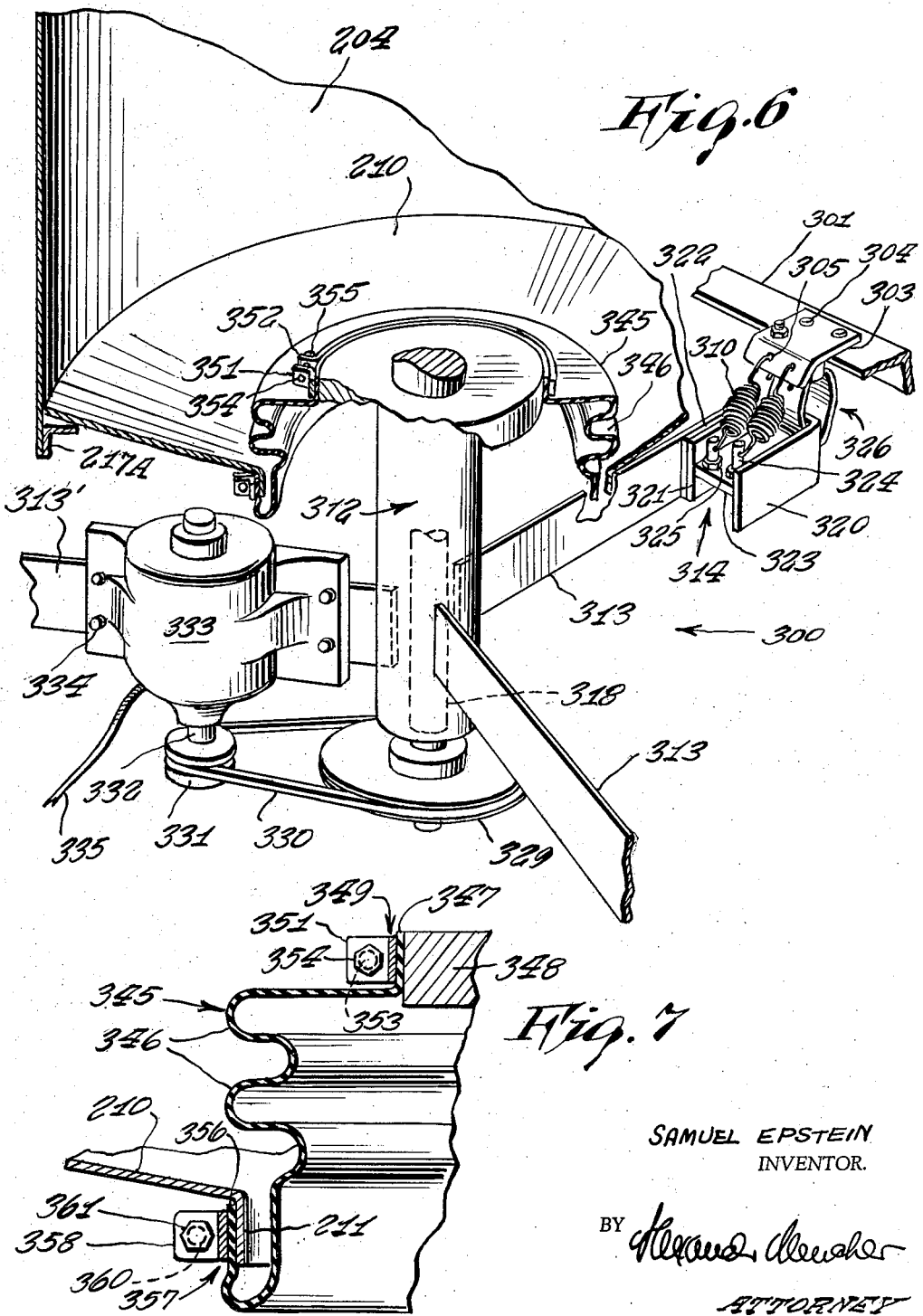
SAMUEL EPSTEIN
INVENTOR.
BY *[signature]*
ATTORNEY

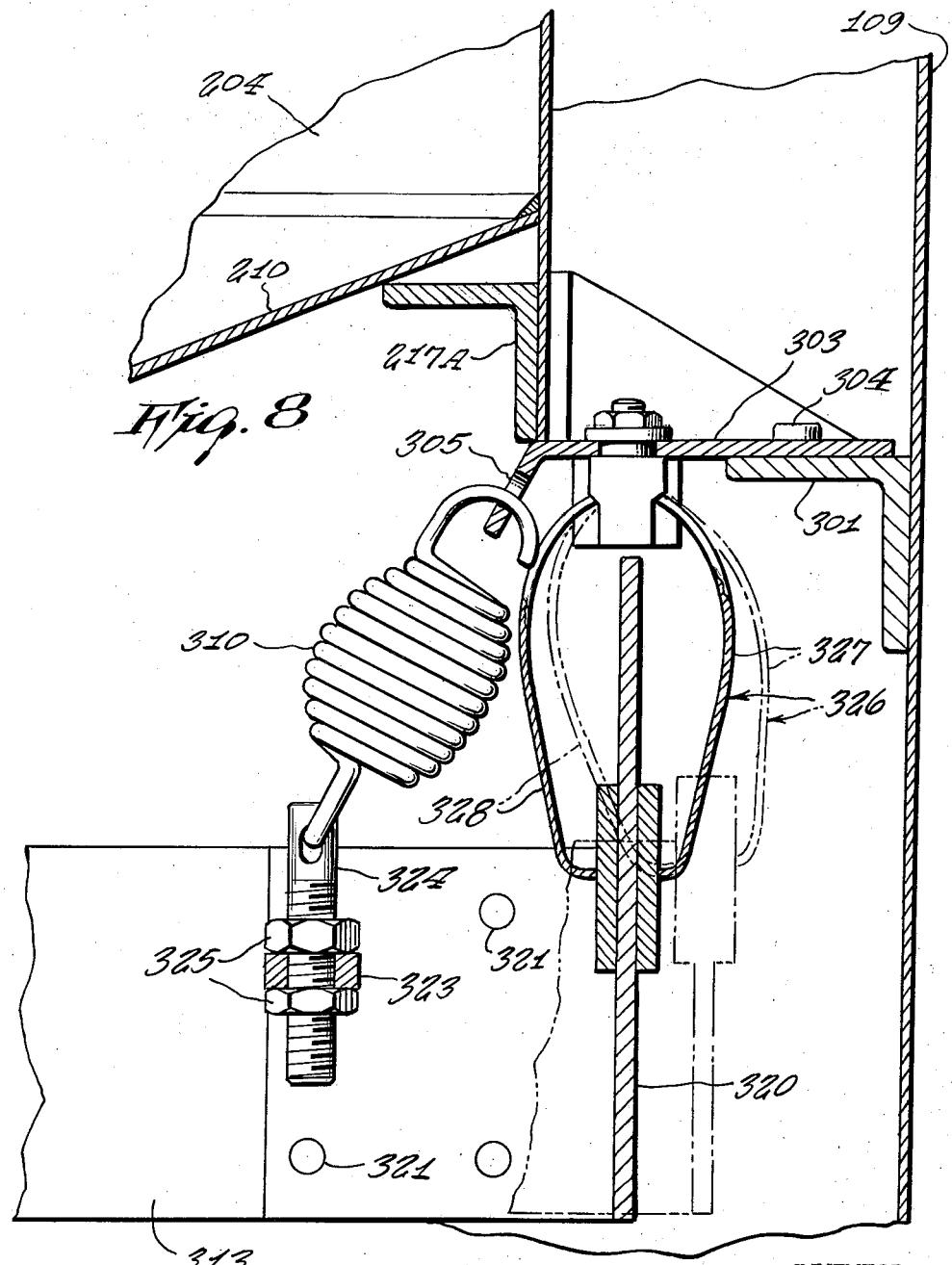

Sept. 10, 1963 S. EPSTEIN 3,103,420
FILM DRIER
Filed Nov. 19, 1959 20 Sheets-Sheet 7
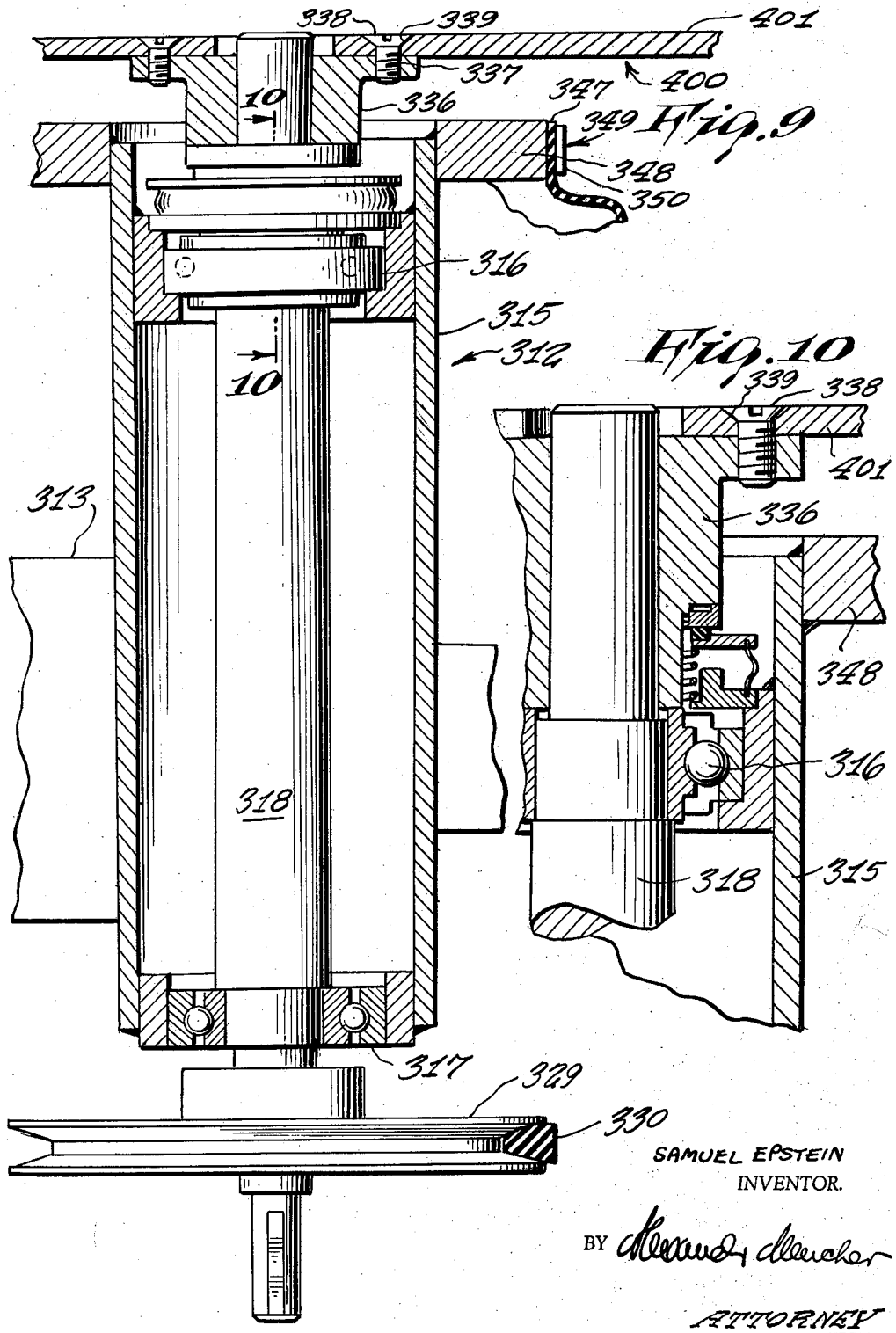
SAMUEL EPSTEIN
INVENTOR.
BY
ATTORNEY

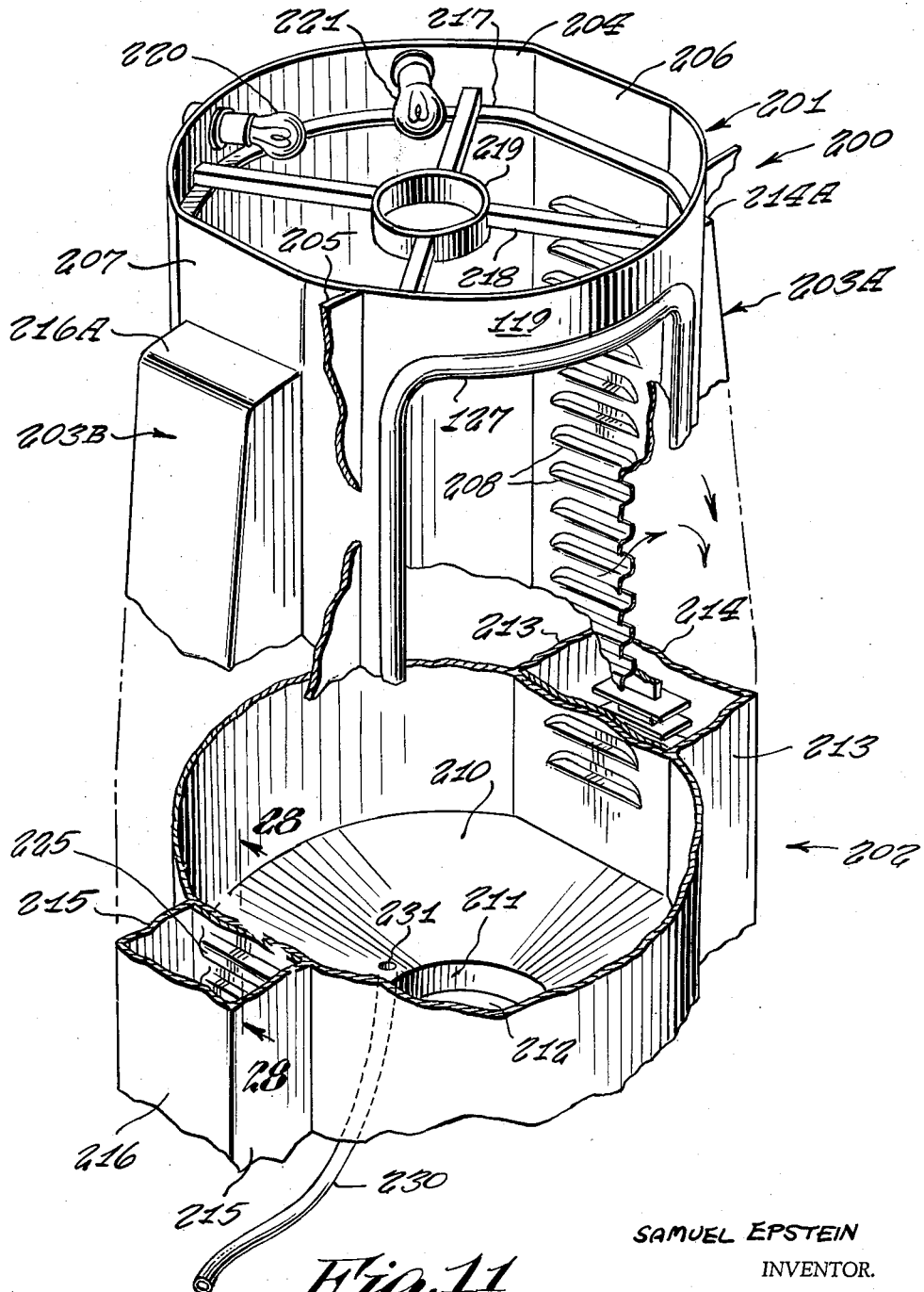

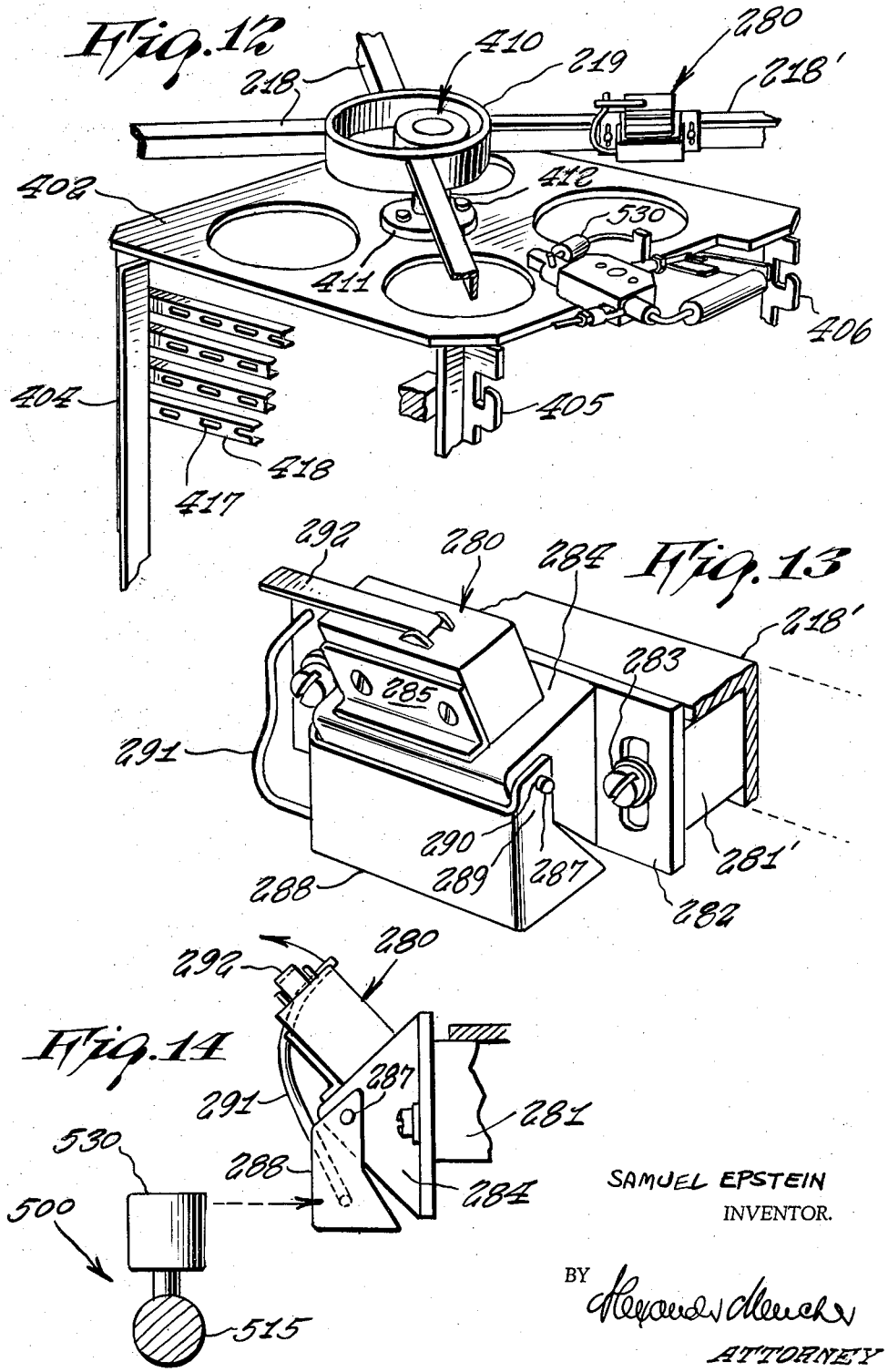

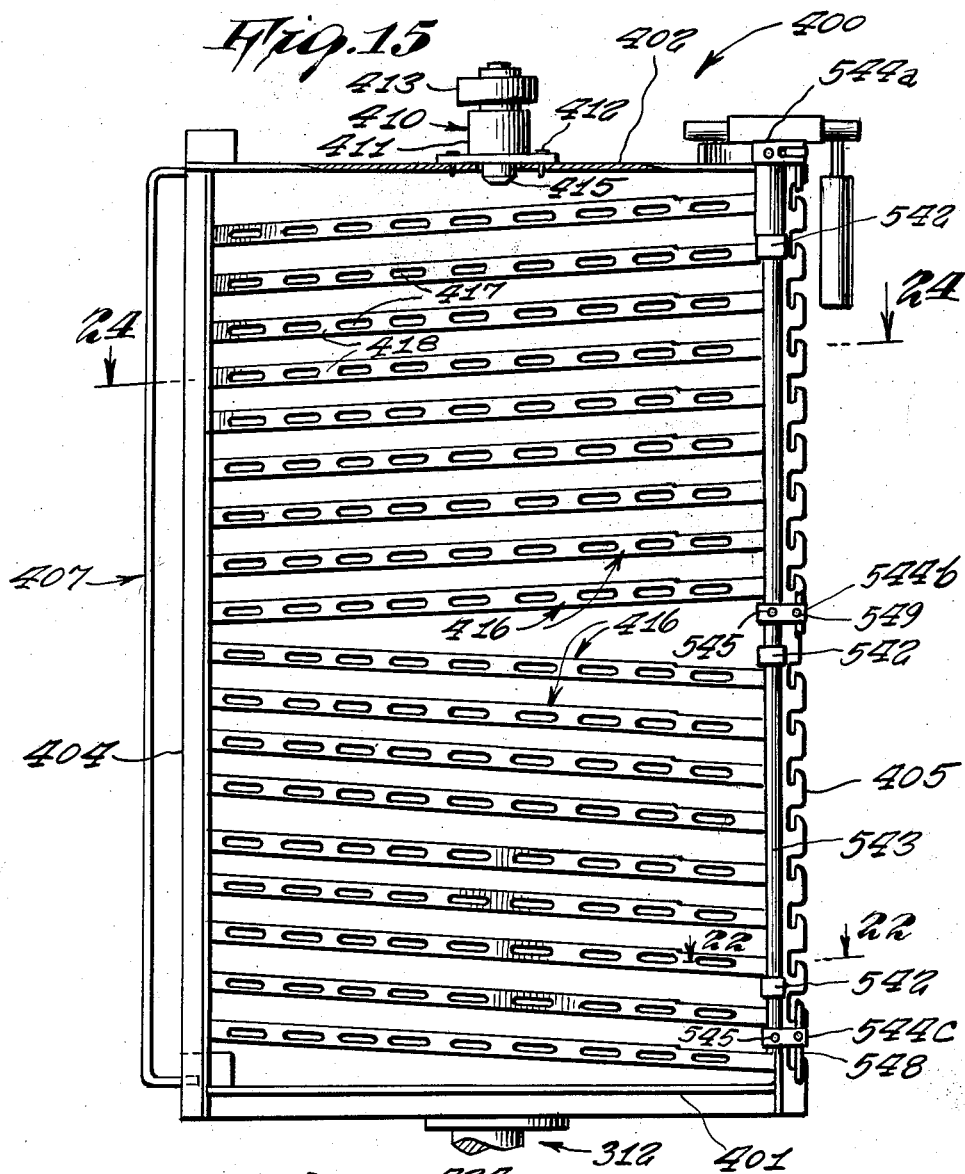
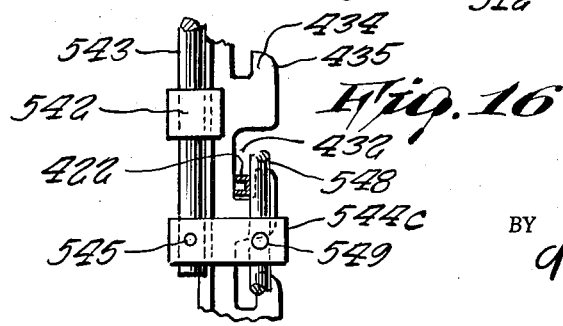
Samuel Epstein
INVENTOR.

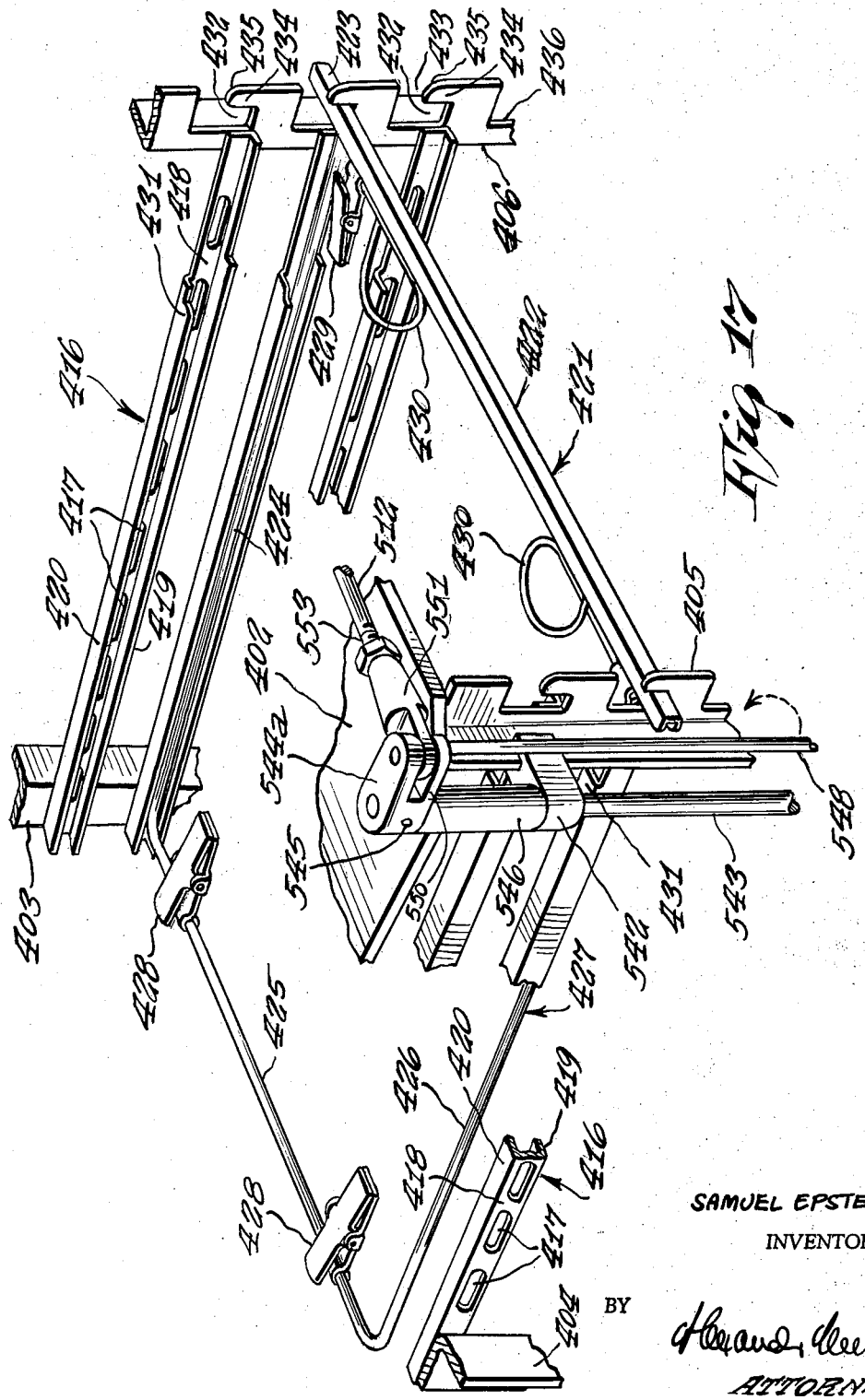

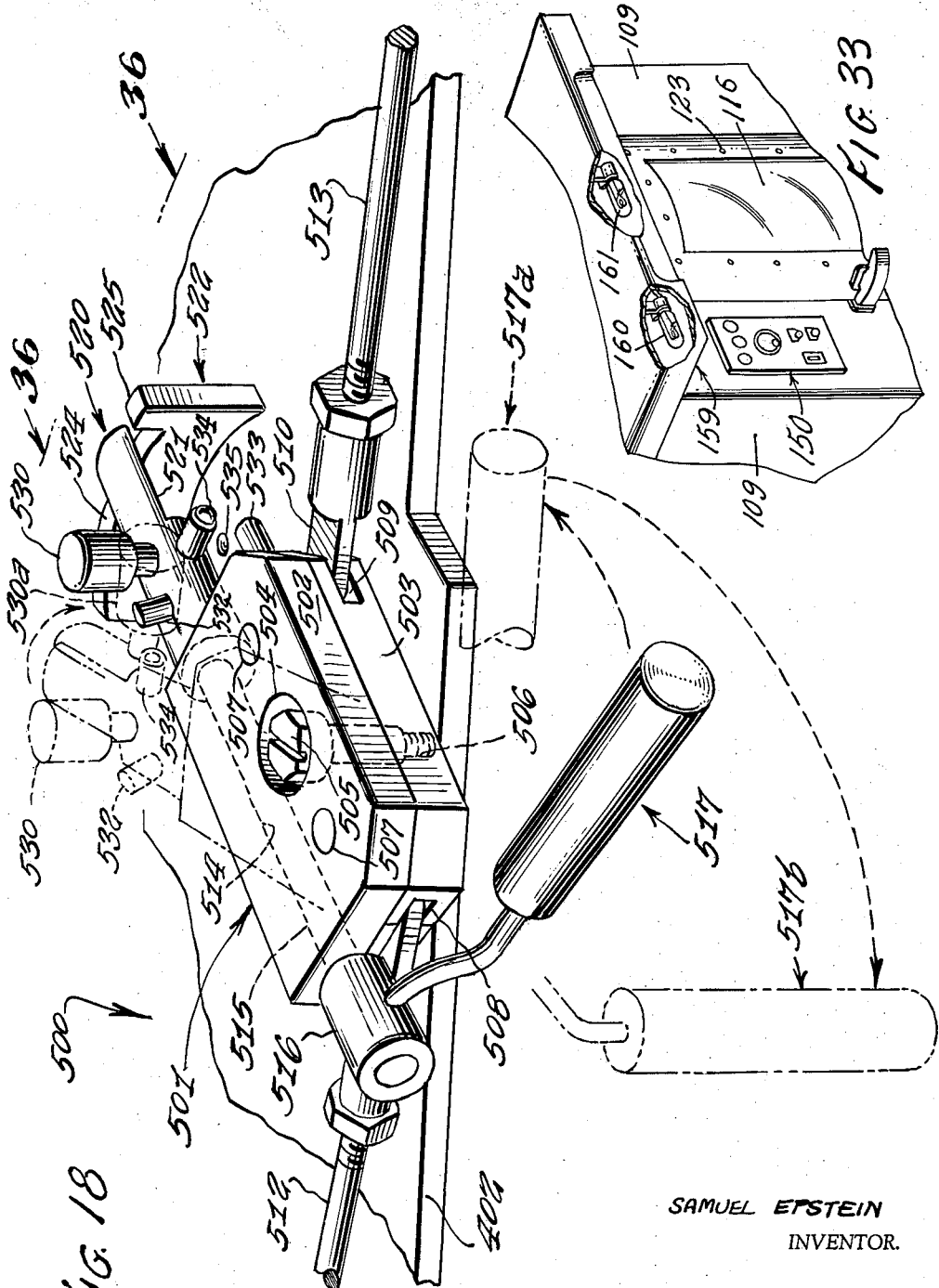

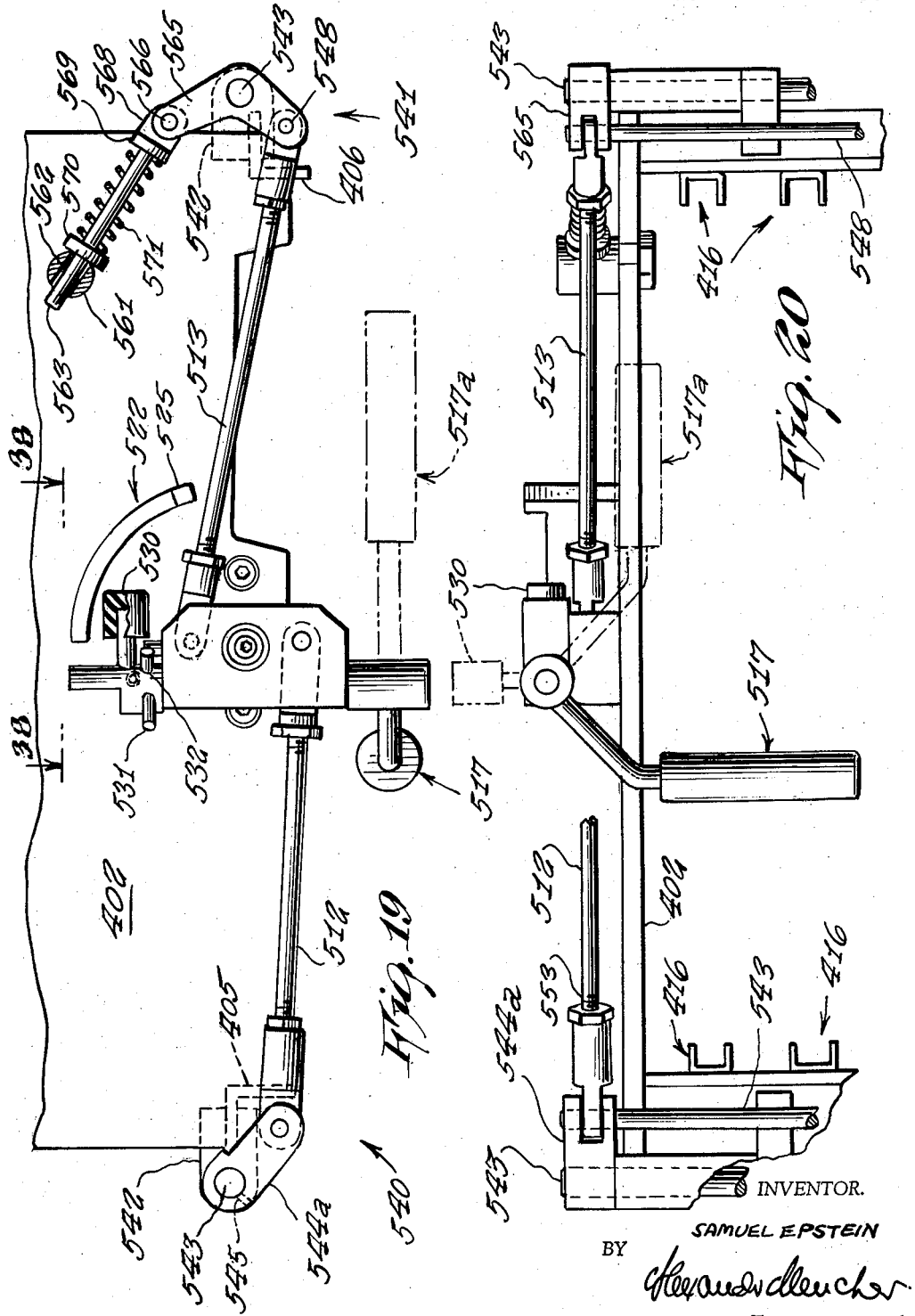

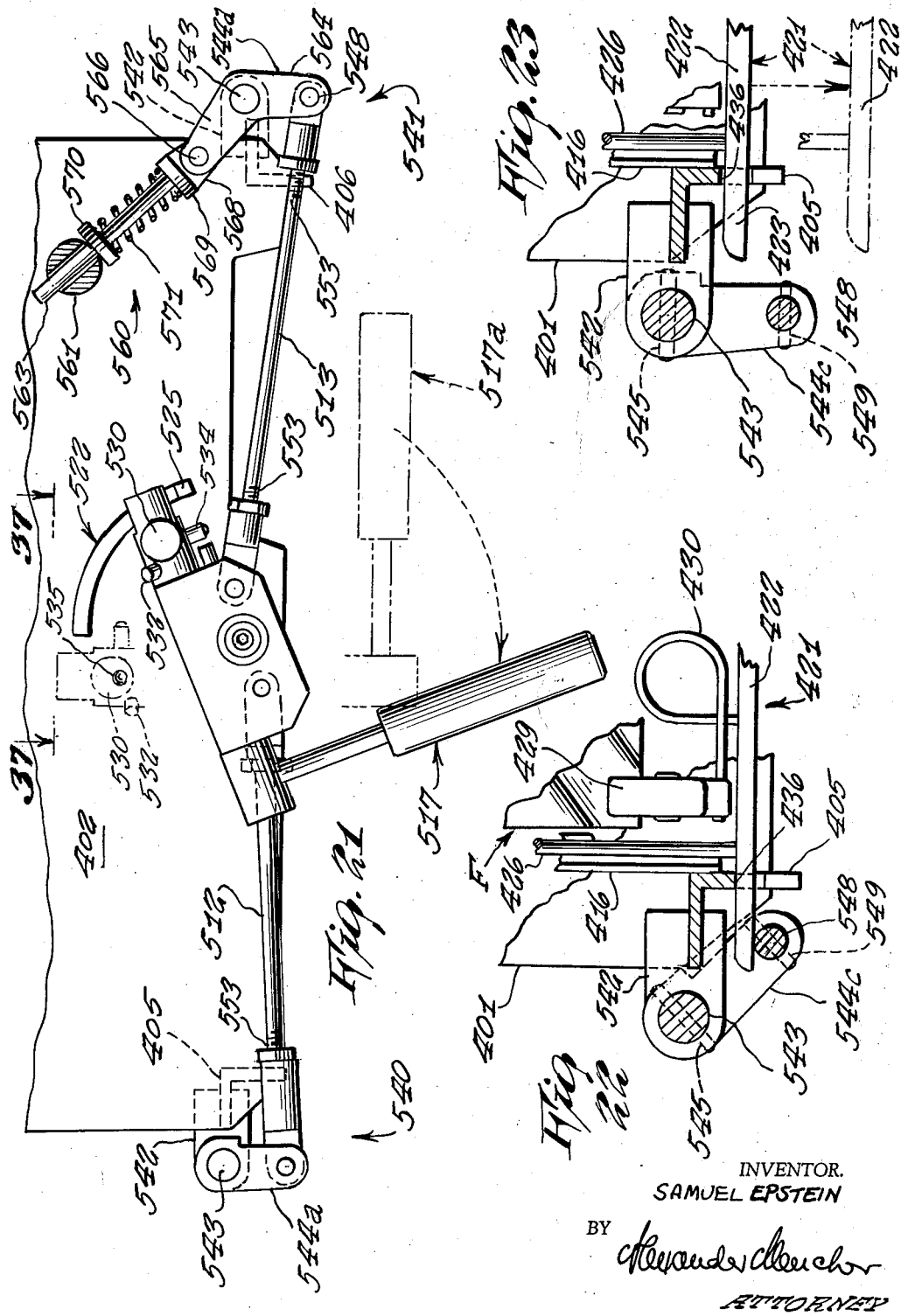

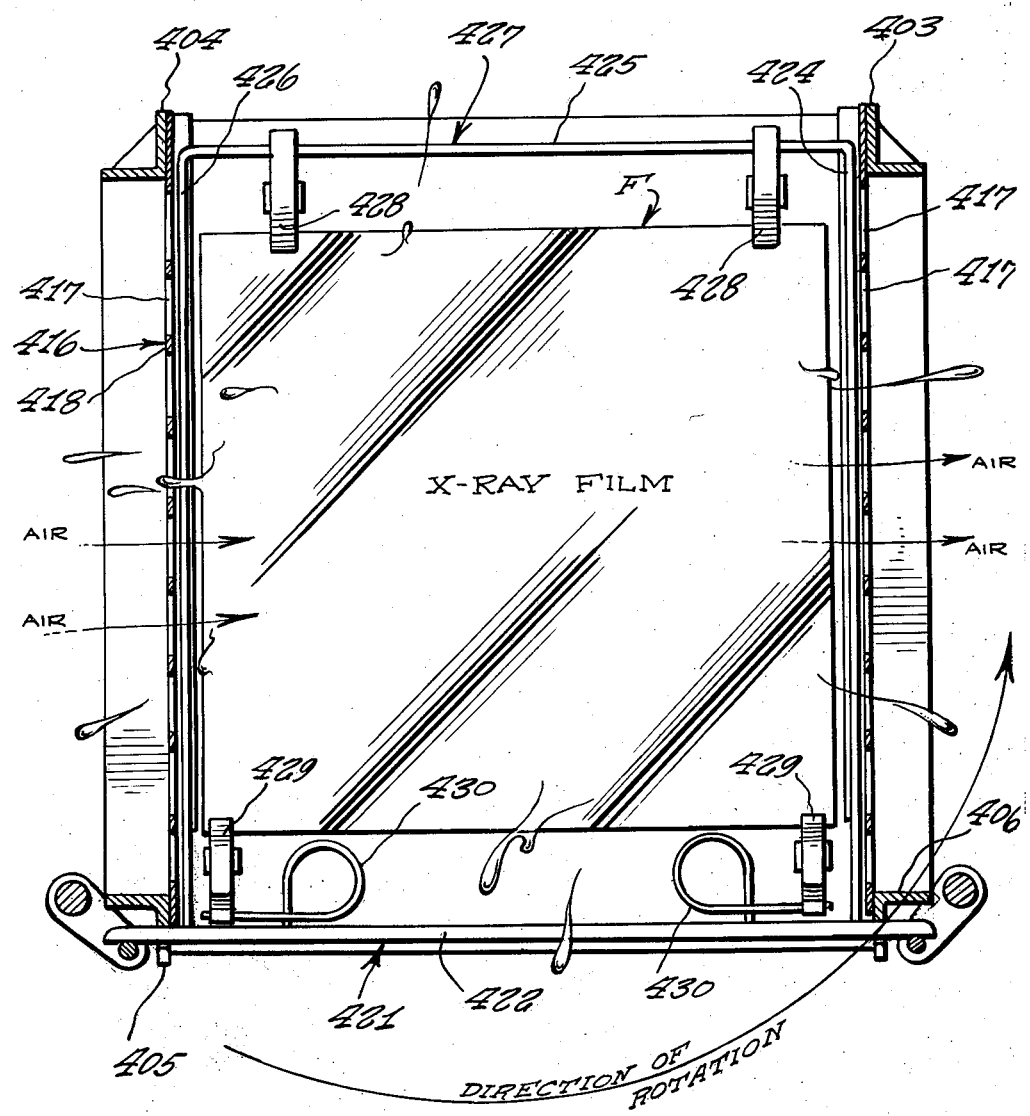

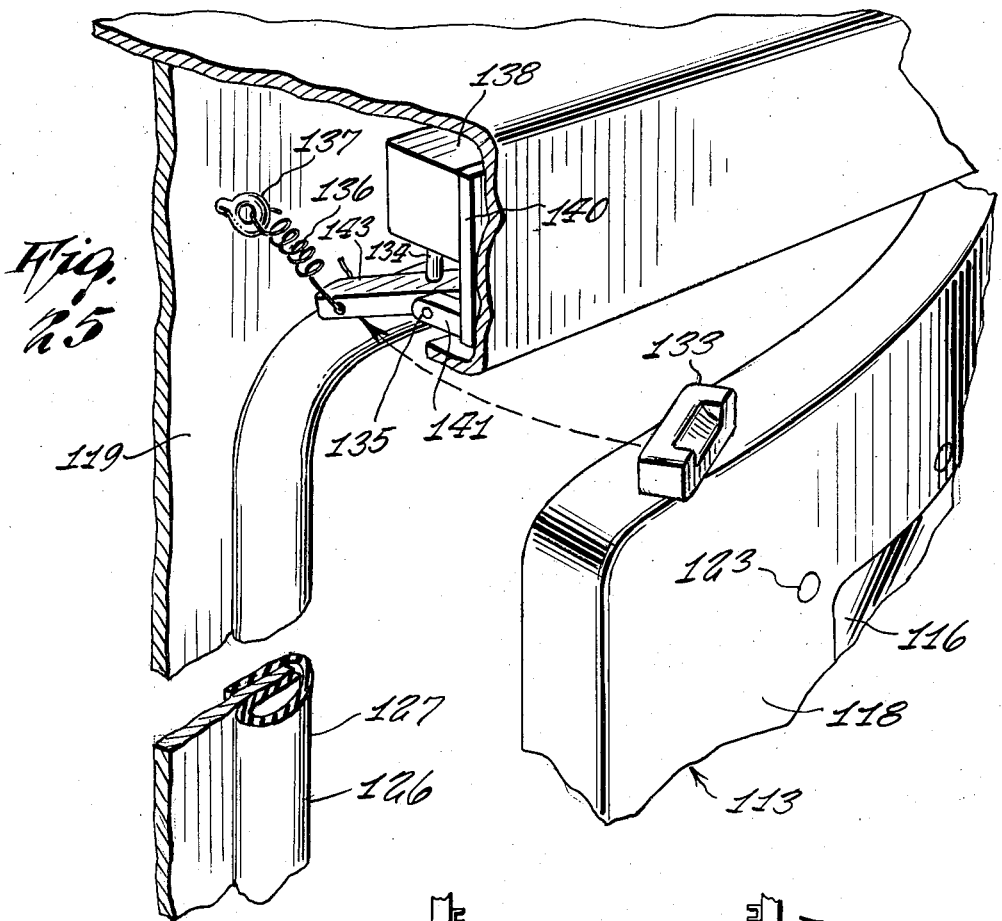
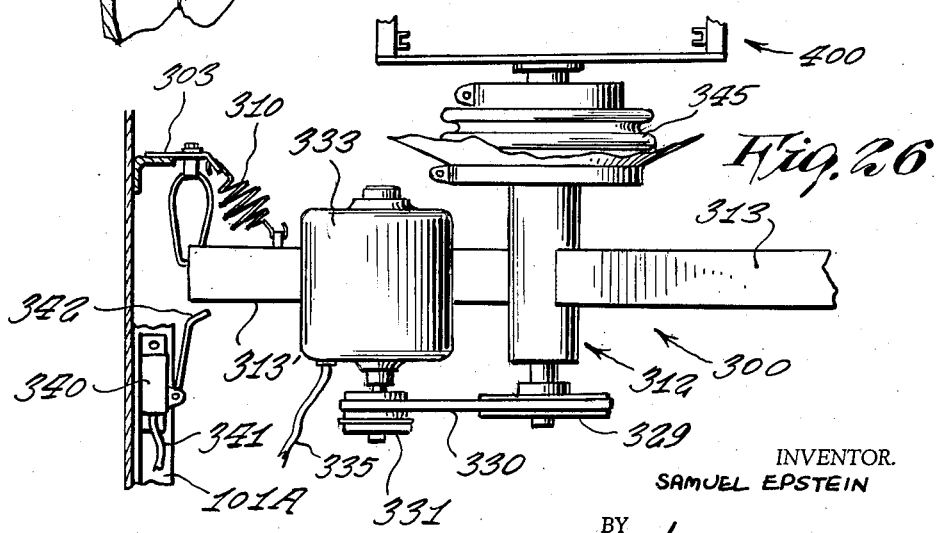

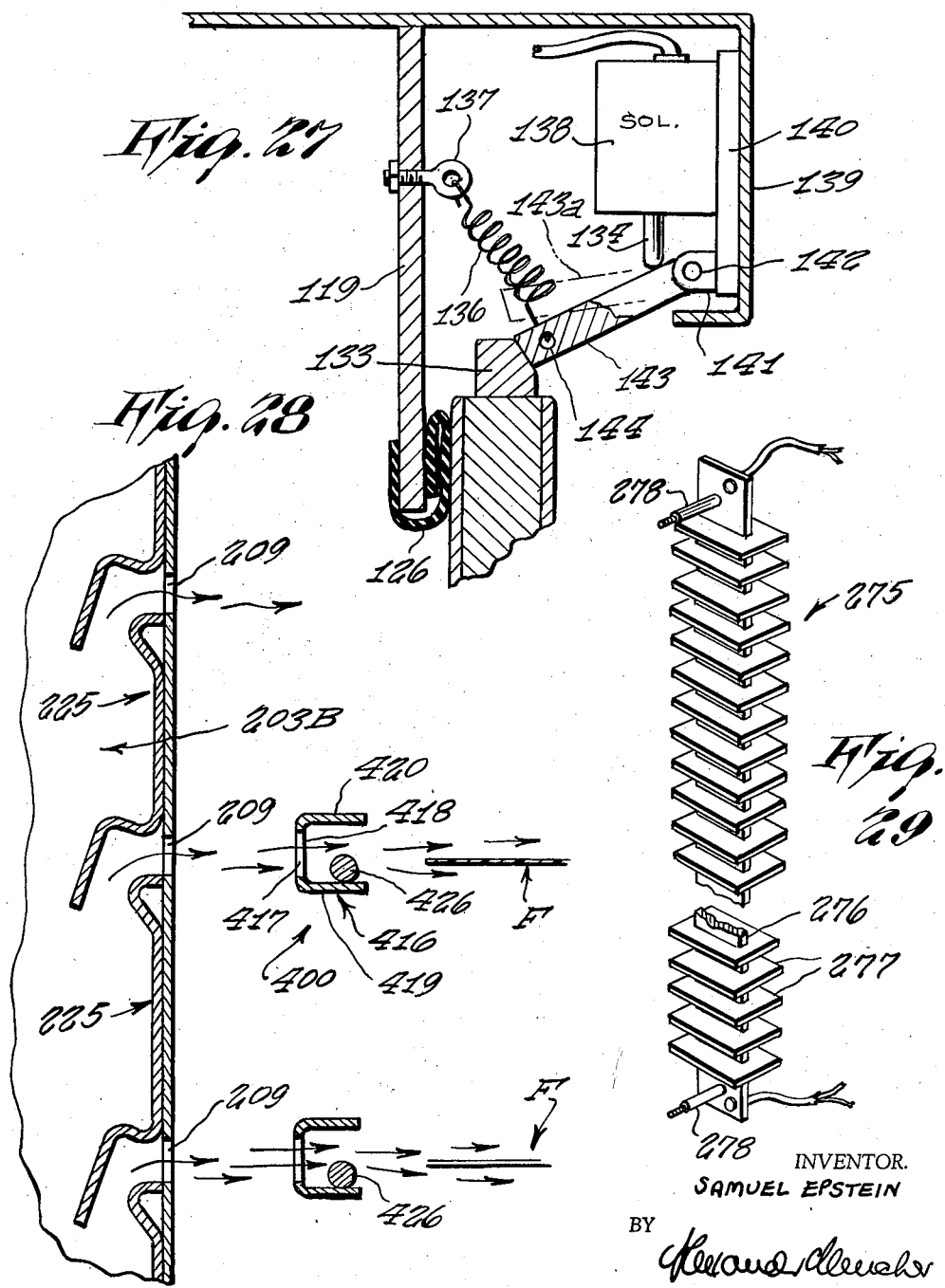

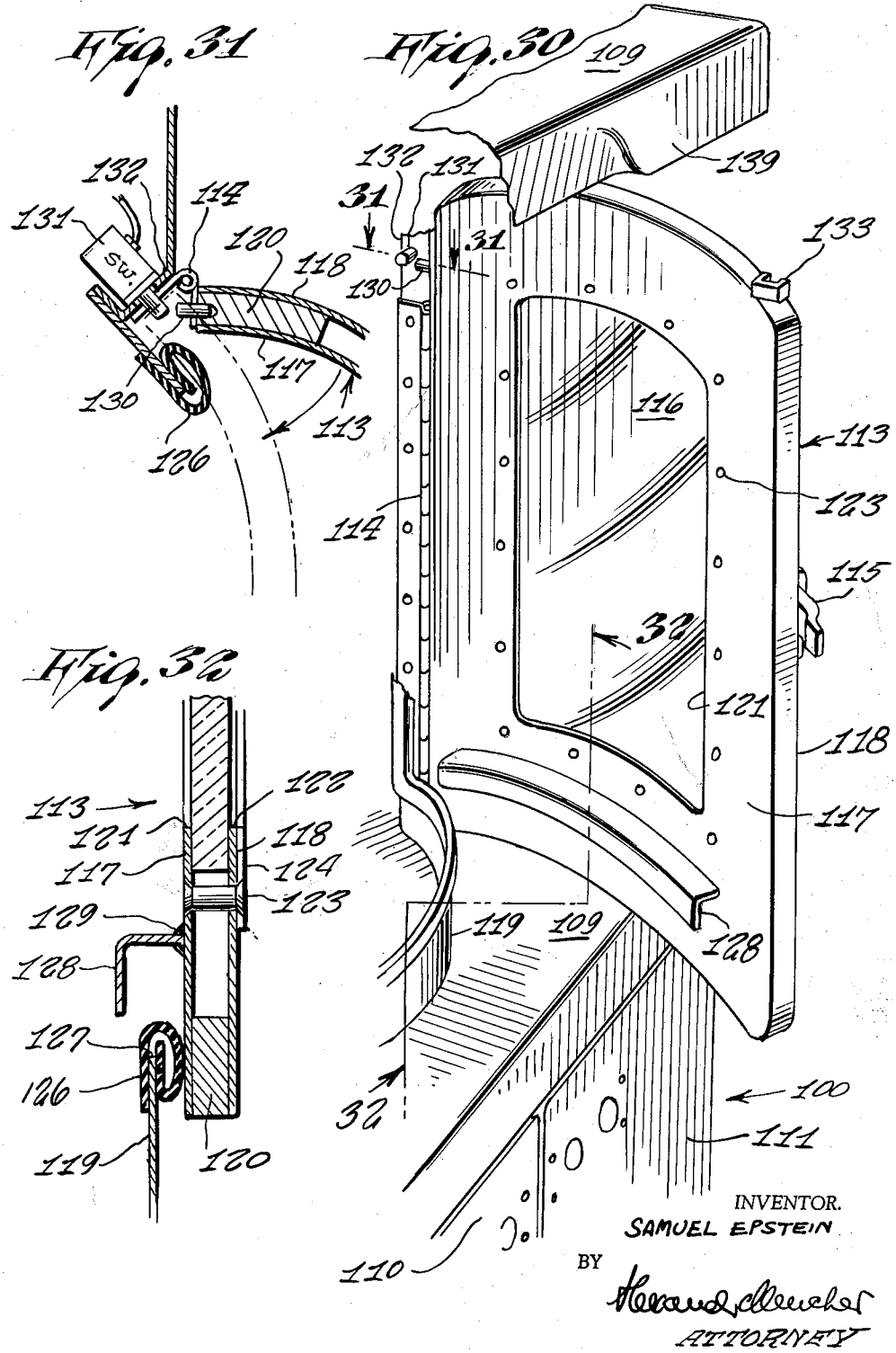

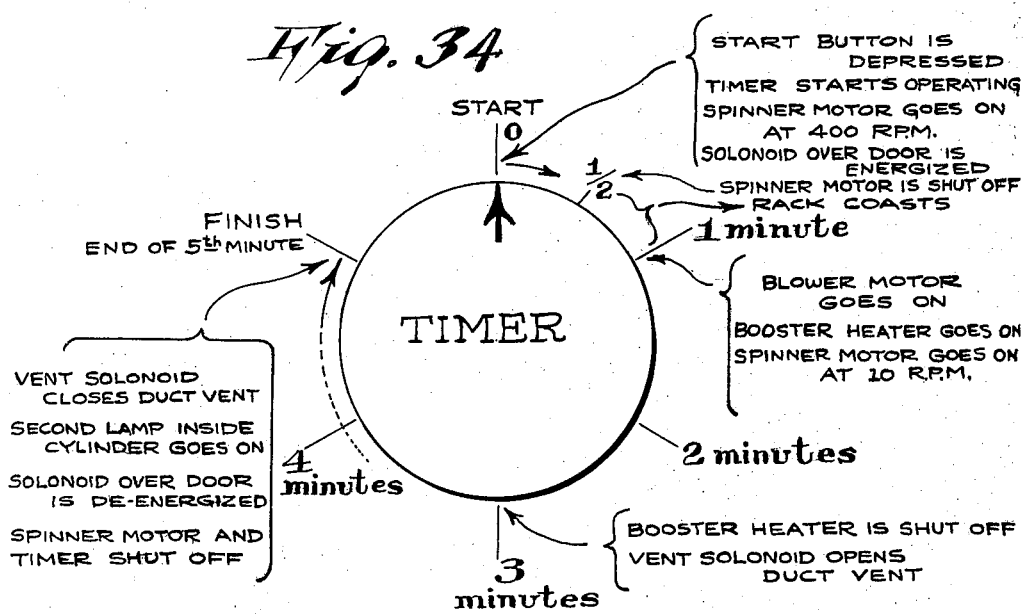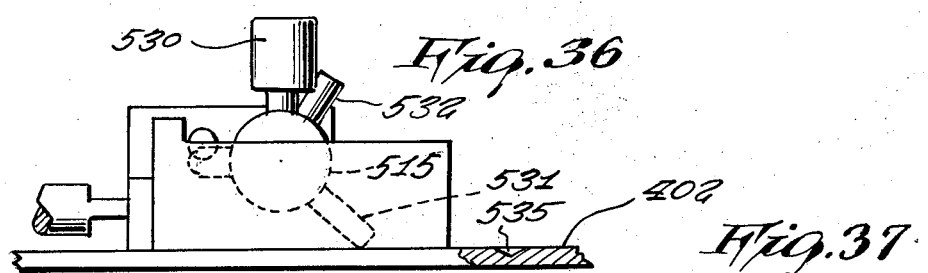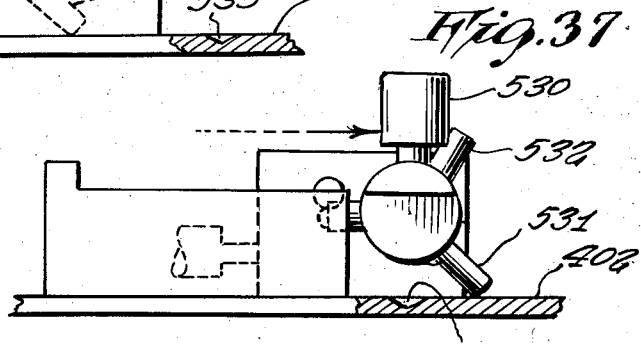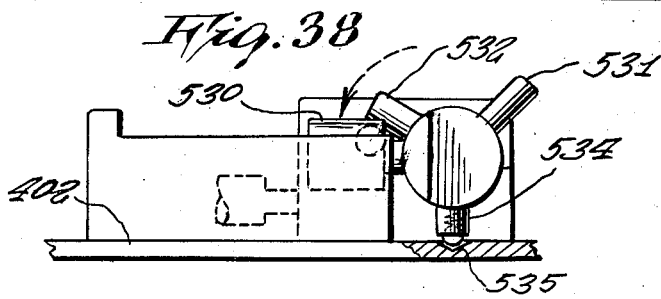

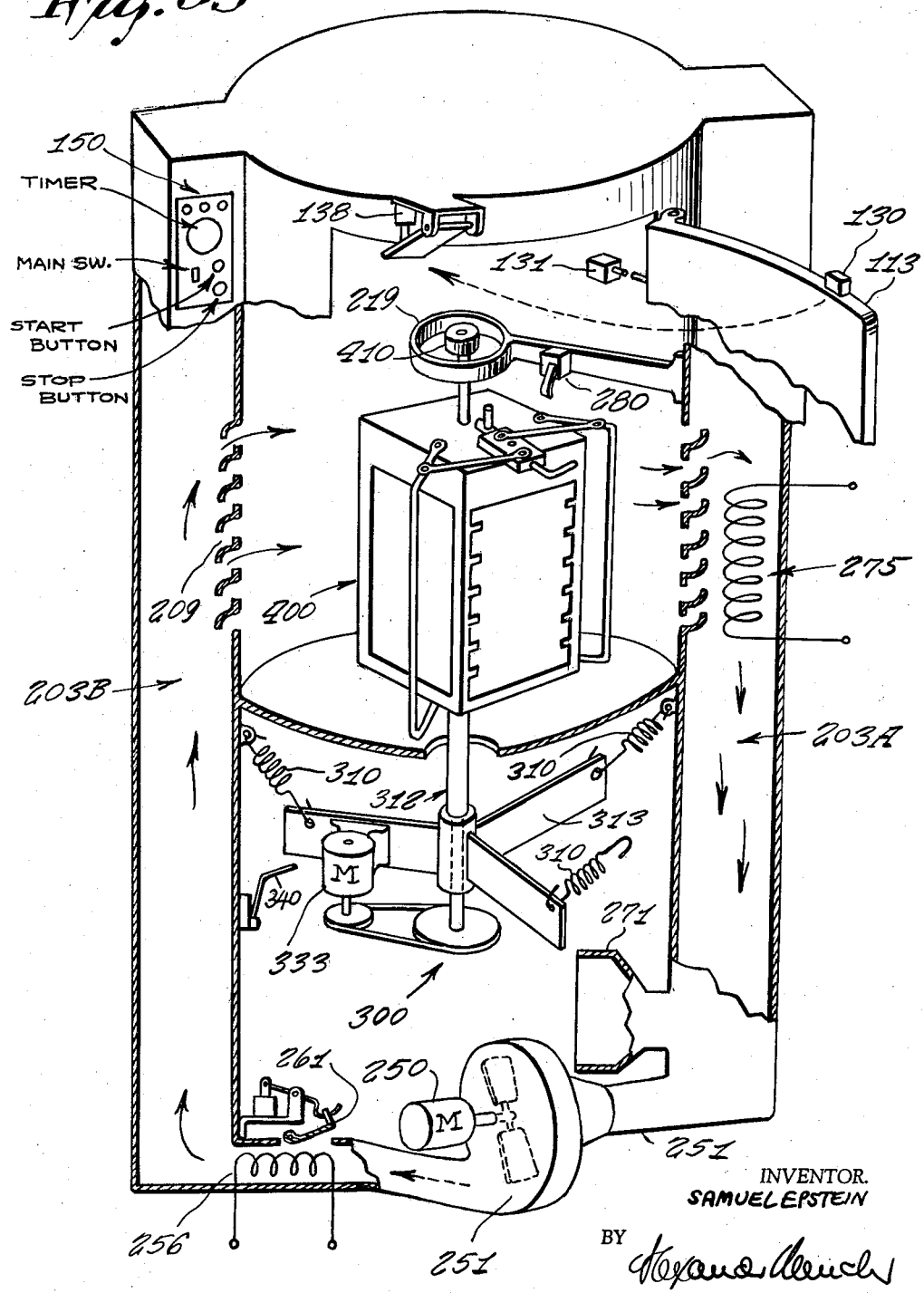

United States Patent Office
3,103,420
Patented Sept. 10, 1963

3,103,420
FILM DRIER
Samuel Epstein, New York, N.Y., assignor of fifty percent to Eric James Ryan, Saddle River, N.J.
Filed Nov. 19, 1959, Ser. No. 858,301
2 Claims. (Cl. 34—58)

This invention relates generally to a new and improved apparatus and a new and improved method of drying X-ray and other types of photographic films.

An object of the invention is to provide a compact unitary structure and method for the safe, efficient and cyclic thorough and uniform drying of X-ray or other photographic films in a minimum time interval without defacement of any nature and wherein all film surfaces and edges thereof are simultaneously dried, including the areas under the film retaining clips. Application of this structure may also be extended to other films or sheets whether emulsion treated or otherwise requiring drying.

The method of operation involves an automatic and cyclically operated two stage multi-speed centrifugal film drier wherein all the free water or fluids on the film and clips for affixation to the frame is eliminated centrifugally in the first spinning stage, and the moisture balance is removed during the second and slower spinning stage by suitably directed and heat controlled air currents and suitable venting.

A further object of the invention therefore is to provide apparatus wherein the difficulty dryable free water or fluid is centrifugally eliminated during a first and high speed spinning stage, and wherein remaining moisture is easily evaporated without film or emulsion defacement during a reduced spinning stage by application of heat controlled air currents and exhausting means.

Further features of the invention reside in the proper alignment of the film and ducts for the incoming and outgoing of said air currents during the second stage of operation of effectuate proper airfoil and to insure against contact of resultant moist air currents to the film surfaces.

A further feature of the invention resides in a cyclic operation of about five minutes for purposes if completely drying wet film and for eliminating streaking and other imperfections on the film heretofore encountered in drying processes wherein the time cycle is attempted to be reduced.

A further object of the invention is to provide a machine and a method which utilizes a combination of spinning motion and air currents to dry wet films and plates.

These objects and other incidental ends and advantages of the invention will hereinafter appear in the progress of the disclosure and as pointed out in the appended claims.

Accompanying this specification are drawings showing a preferred form of the invention wherein:

FIGURE 5a is a cross-sectional view through the plane 5—5 of FIGURE 4;

FIGURE 6 is a perspective view of the rack suspension and driving mechanism;

FIGURE 7 is an enlarged view in perspective of a portion of the mechanism shown in FIGURE 6;

FIGURE 8 is an enlarged side view in elevation of the suspension spring and retaining mechanism shown in FIGURE 6;

FIGURE 9 is a cross-sectional view through the plane 9—9 of FIGURE 3;

FIGURE 10 is an enlarged cross-sectional view through the plane 10—10 of FIGURE 9.

FIGURE 11 is a perspective view shown partly broken away and in cross-section showing the cylinder and duct assemblies;

FIGURE 12 is a perspective view of the upper part of the film rack or frame and its retaining journal box;

FIGURE 13 is a perspective view of a safety switch unit shown in FIGURE 12 and used for automatically stopping the machine if the rack is improperly locked or accidently left unlocked;

FIGURE 14 is a side view in elevation of the safety switch unit shown in FIGURE 13;

FIGURE 15 is a side view in elevation of the rack assembly;

FIGURE 16 is an enlarged view in elevation of the lower right hand portion of said rack assembly for greater clarity of details;

FIGURE 17 is a fragmentary perspective view of a portion of the rack assembly;

FIGURE 18 is a perspective view of the rack latch mechanism shown in fully unlocked position;

FIGURE 19 is a plan view of the rack latch mechanism shown in a fully locked position;

FIGURE 20 is a front view in elevation thereof shown in a fully locked position;

FIGURE 21 is a plan view thereof in a fully unlocked position;

FIGURE 22 is a cross-sectional view through the plane 22—22 of the rack assembly of FIGURE 15 shown in locked position;

FIGURE 23 is a view similar to FIGURE 22 of the rack assembly shown in unlocked position;

FIGURE 24 is a cross-sectional view through the plane 21—21 of the rack assembly of FIGURE 15;

FIGURE 25 is a perspective view showing the safety door lock-switch;

FIGURE 26 is a fragmentary side view in elevation of the rack suspension and driving mechanism showing a safety switch incorporated therewith;

FIGURE 27 is a side view in elevation of the safety door lock-switch shown in operative position;

FIGURE 28 is a cross-sectional view through the plane 28—28 of the cylinder and duct assemblies of FIGURE 11;

FIGURE 29 is a perspective view of the stand-by heater;

FIGURE 30 is a perspective view of the door showing the contact safety-switch located at its hinge;

Figure 1:
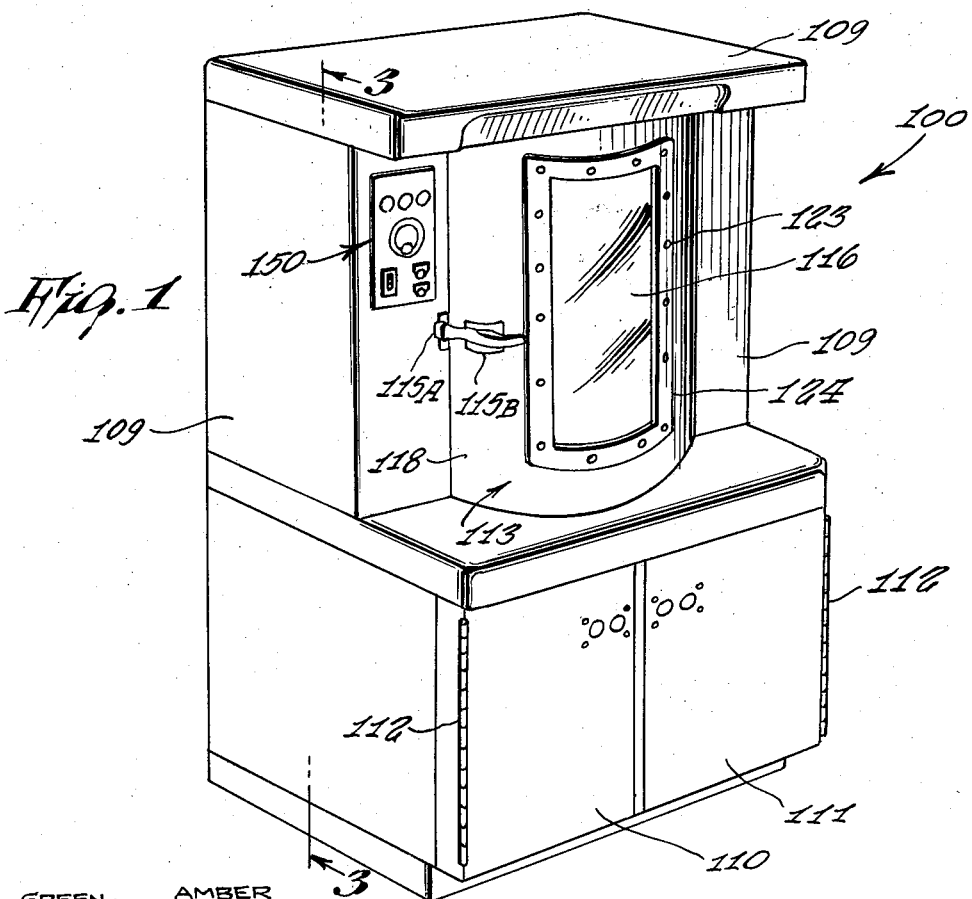
FIGURE 1 is a front perspective view of the assembled machine.

FIGURES 31 and 32 are cross-sectional views through planes 31—31 and 32—32 of FIGURE 30;

FIGURE 33 is a fragmentary front perspective view of the machine showing positions of two external lamps to light the control panel and doorway;

FIGURE 34 is a diagrammatic view of the timer indicating positions for sequence of timing operations;

FIGURE 35 is a vertical perspective and diagrammatic view partly in section showing the general structure of the machine;

FIGURE 36 is a view looking in the direction of the arrows 36—36 shown in FIGURE 18, showing the latching mechanism in fully unlocked position;

FIGURE 37 is a view looking in the direction of the arrows 37—37 shown in FIGURE 21 and showing the latching mechanism in the phantom position of FIGURE 21 and which is an intermediate position between fully unlocked and fully locked condition;

FIGURE 38 is a view looking in the direction of the arrows 38—38 shown in FIGURE 19 showing the latching mechanism in fully locked position.

Broadly, the drier may be resolved into several operational and structural units including: (I) a main frame having enclosing and control panels and doors, the reference numerals to details thereof ranging from 100 to 200; (II) a cylinder disposed within the upper part of the main frame and ducts leading thereto for housing a rotatable rack adapted to carry the film or plates to be dried, the reference numerals to details thereof ranging from 200 to 300; (III) a rack suspension mounting and drive therefor, reference numerals to details ranging from 300 to 400; (IV) the rack structure, details being indicated by reference numerals 400 to 500; (V) latching means for the rack structure, details being indicated by reference numerals 500 to 600. There are built-in safety devices, circuits and a timer structure which will be described at suitable places within the specification.

Essentially, the drier is completely automatic and its more important novel features include drying divided into a centrifuge stage and a hot air convection stage, disposition of the film for double surface drying even at the areas of the clips, and finally reduction of time needed for drying and preservation of the image, factors which are highly important to surgeons who require accuracy in the film and speed of inspection for setting and operative purposes.

(I) THE MAIN FRAME

Figure 3:
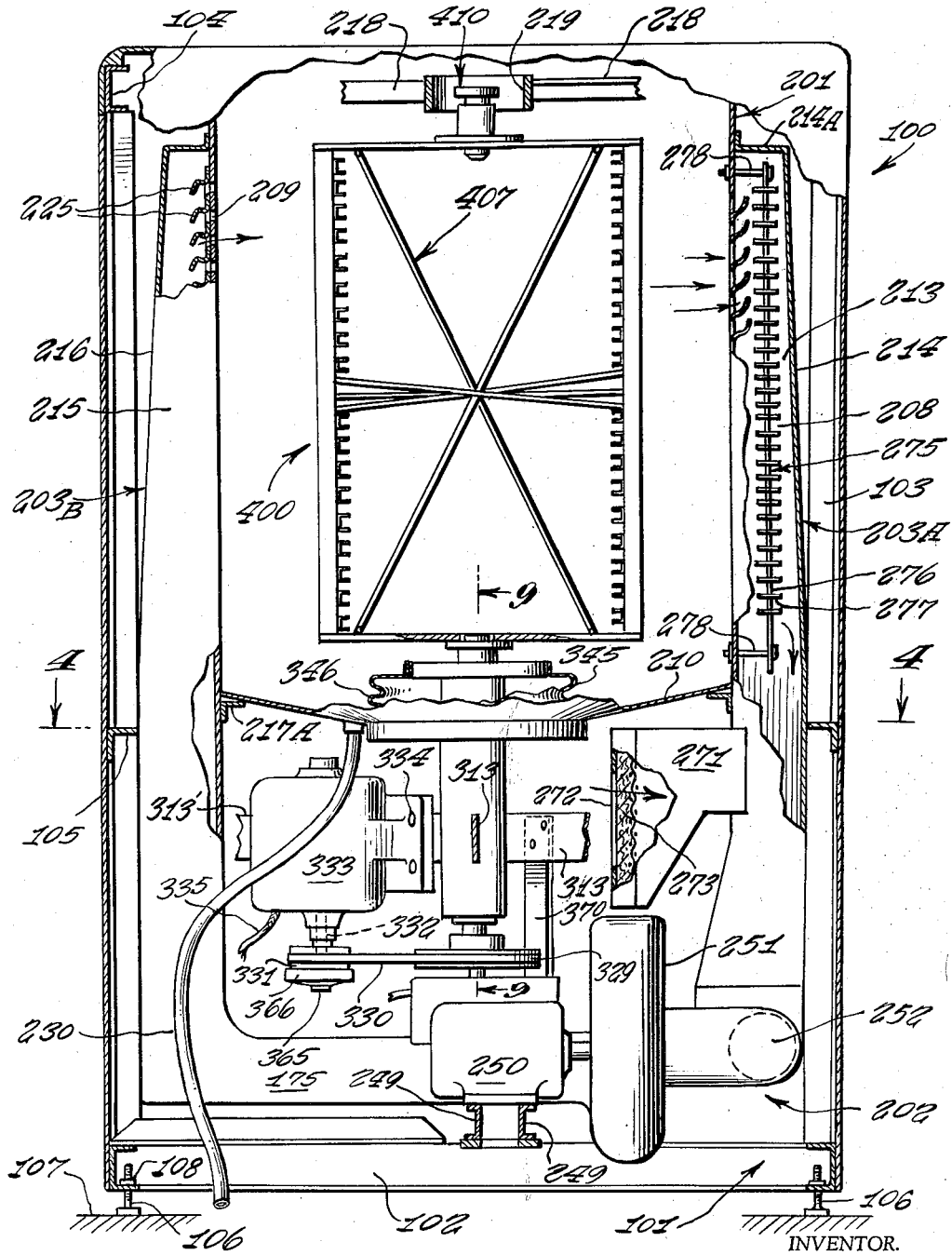
FIGURE 3 is a cross-sectional view through the plane 3—3 of FIGURE 1.
Figure 4:
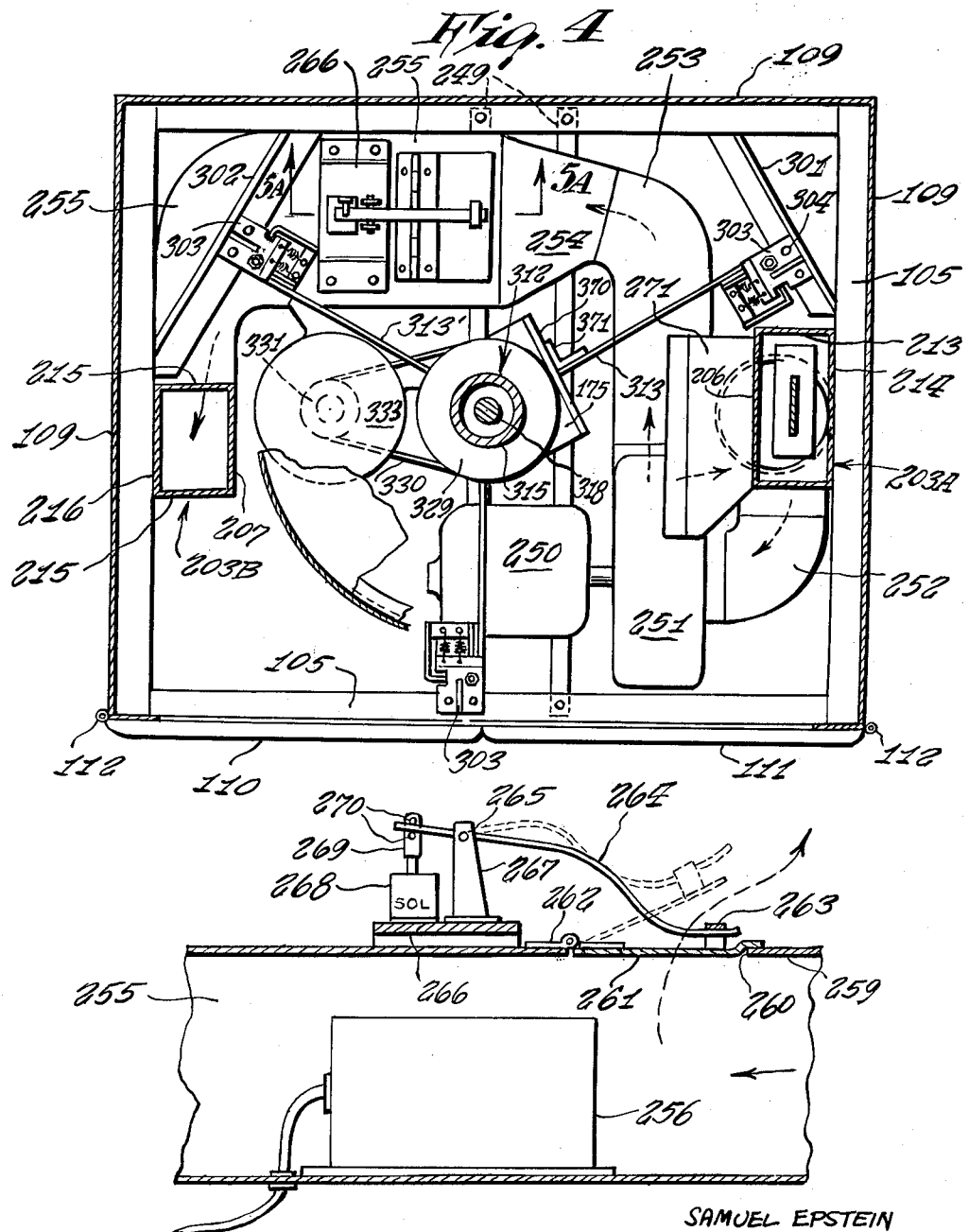
FIGURE 4 is a cross-sectional view through the plane 4—4 of FIGURE 3.

Referring now to the parts in detail and more particularly to the framework and housing of the machine, there is shown in FIGURES 1, 3 and 4 the assembled machine 100 having a main framework 101 for supporting the structure. This framework is comprised of a rectangular base frame formed of four channel beams 102, and standing upright therefrom and added thereto are side vertical angle beams 103 capped at their top by a crown horizontal rectangular frame formed of channel beams 104, and an intermediate horizontal frame formed of angle beams 105 for further strengthening the structure. The framework is suitably welded together and is supported on four adjustable leveling bolts 106 which rest upon the floor 107. Nuts 108 lock the bolts in the desired position. The framework is suitably covered on its outer side as by panels 109 for upper and lower chamber formation and to protect innerly mounted structure. Two doors 110 and 111 on hinges 112 are provided for access to the lower chamber of the machine. A curved door 113 on hinges 114 provides access to the upper chamber of the machine and is provided with a refrigerator door type hasp 115a and a draw bolt 115b are employed to lock the door 113. A window 116 made of transparent plastic or of glass is incorporated in said door to permit viewing of the drying operation without need of opening the door and stopping the work.

Door 113 is formed of two metal panels 117 and 118 curved to conform with curved wall 119 of the machine upper chamber, the two panels being welded to and held in spaced relation by a metal frame spacer 120 at the periphery thereof as may be seen in FIGS. 30—32. Aligned openings 121 and 122 are provided in panels 117 and 118 respectively, and window 116 is located in the space between said openings. Rivets 123 are passed through the two panels around the window, and through the bezel 124 to secure the window firmly in place.

Door 113 is provided for covering door opening 127 in the upper chamber, the said opening being framed with refrigerator-door type gasket 126 mounted around the periphery thereof. A baffle 128 is rigidly fixed by a weld 129 to the interior side of the door at the lower end to prevent dripping of moisture into the crevice between the said gasket and door along the doorway bottom as best seen in FIGURE 32.

Ia.—Safety Mechanisms

The machine is provided with several safety mechanisms to insure the operator against injury to himself or damage to the machinery.

One of these as seen in FIGS. 30 and 31 is provision of an electrical switch at the hinge of door 113 leading into a cylinder 201 as will appear. The switch is connected in series in a circuit (not shown) causing rack rotation inside the cylinder and is normally open when the door is open and closing only when the door is closed. This eliminates danger of accessibility by the operator's hand to moving mechanisms. Thus, should the start button be prematurely depressed while door 113 is yet unclosed, the circuit will still be inoperative for rack rotation. Switch 131 is mounted on a wall 132 which forms one edge of the door opening 127, this edge being adjacent the door hinge 114. The switch is provided with an activating plunger 131 which extends into the path of the door 113, the latter being provided with a corresponding pin 130 which produces the actual movement of the plunger.

Another safety feature of the machine as shown in FIGS. 25 and 27 is provision of an electrical solenoid 138 to prevent premature opening of door 113 and exposing the operating mechanism to one's hands. A cam element 133 is rigidly fixed to the top edge of door 113, which engages the solenoid mechanism when the door is closed and the machine operation is started. Attached to the interior side of an overhanging wall 139 of the upper chamber is a bracket 140 upon which solenoid 138 is mounted. At the lower end of the bracket a bearing stanchion 141 is provided through which a pin 142 is passed, said pin serving as a pivot for one end of depending bar 143, the other end of which is provided with an opening 144 into which one end of a tension coil spring 136 is hooked, the other end of the spring being anchored to eye bolt 137 screwed into curved panel wall 119 of the upper chamber. Bar 143 is located below the solenoid in a position so that solenoid plunger 134 is able to bear against it when the solenoid is energized. Normally, when solenoid plunger is not bearing against bar 143, tension spring 136 pulls the said bar upward above and out of the way of cam 133. Thus, when door 113 is moved into closing position, bar 143 is in the position indicated as 143a (FIG. 27) and remains so until after the starting button 152 on the control panel 150 is depressed thereby energizing the solenoid to cause the plunger 134 to force bar 143 downwardly in an arc about its pivot pin 142 to overcome the weaker, opposing force of spring 136. The swinging end of the bar is thus brought into abutment with cam 133 to prevent opening of the door 113 until the full cycle of the machine operation is completed. At the end of the cycle, solenoid 138 is de-energized and spring 136 is again unopposed to lift said bar free from the path of cam 133 thereby permitting the opening of the door.

Other safety devices the purposes of which are designed to prevent destruction of the machine and not involved in the promotion of safety for the operator are (1) the sway control micro-switch 340 (shown in FIG. 26); (2) the latch control switch 280 shown in FIGS. 12, 13 and 14; and (3) rack suspension insulation 322 in the rack suspension unit. All of said features will be discussed in detail later in the specification.

Ib.—The Control Panel

Figure 2:
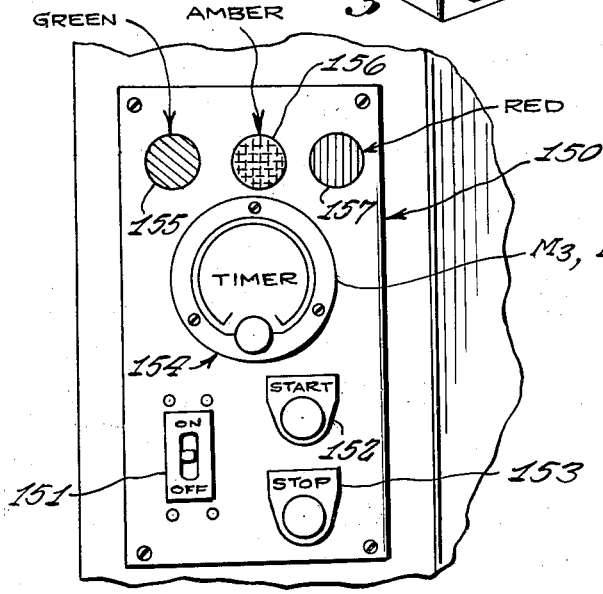
FIGURE 2 is an enlarged front view of the control panel.

As seen in FIGS. 1 and 2, a control panel 150 for electrically operating the machine and controlling its performance, is conveniently located on the front wall of the upper chamber of the machine where it may be conveniently manipulated and easily seen.

The control panel includes an off-on main switch 151, a start button 152, a stop button 153, a timer 154 for the sequence and time limit of each operation in the cycle, a green lamp 155, an amber lamp 156 and red lamp 157. The operation of these will be readily apparent from a study of the FIGURE 34 diagram and sequence operation to be described subsequently in this specification.

An electric lamp 160 is provided inside the overhanging front portion of the upper chamber and below the machine roof as indicated at 159 in FIGURE 33, for the purpose of furnishing adequate light to read the control panel therebelow. This lamp is immediately energized upon closing the main on-off switch 151. Another lamp 161 is similarly located under the machine roof above door 113 to furnish adequate light on the doorway during loading or unloading of film holders therethrough. This lamp is also energized upon closing of the main switch 151.

Within the housing of the main framework are located the following several units most of which may be seen in FIG. 3 and which comprise the working mechanisms of the machine: a cylinder and duct unit 200; a rack suspension and drive 300; a rack 400 and rack latch mechanism 500. Also included is an electrical system for operation of the machine, which includes the control panel 150.

(II) THE CYLINDER AND DUCT UNIT

The cylinder and duct unit 200, as seen in FIGURE 3, comprises an upright cylinder 201 disposed in the upper part of the machine and an air duct system 202 extending throughout the machine height, said structures being supported by the main framework of machine 100.

Cylinder 201 as seen in detail in FIGURE 11 has a curved or arced rear wall 204, a front curved wall 205, a portion of which forms the machine outer wall 119 with opening 127 therein for door 113, and flat side walls 206 and 207 provided with air vents 208 and 209 respectively. A correspondingly irregular circular ring 217 is affixed on the inner side of the cylinder and near its upper edge for reinforcement. A corresponding similar ring 217a is affixed near the bottom. A bottom wall 210 is integrally attached to cylinder 201 as by welding and sloping downwardly toward its center as an inverted cone, and is provided with a circular opening 212 at its center, the bottom wall forming a downwardly extending flange therearound as at 211. Adjacent edge of opening 212 is a drain hole 231 in bottom wall 210 to the underside of which a flexible rubber hose 230 is attached for purpose of draining off expelled fluid from the films or condensed vapor to any convenient pail or receptacle.

Adjacent the top edge and inside cylinder 201, two electric lamps 220 and 221 are provided to furnish light for viewing the work in the machine; one of said lamps goes on with the main switch 151 and the other goes on at the end of the operation cycle. There is also centrally provided adjacent the top and inside said cylinder a hub-like ring 219 welded to radiating spokes 218, said spokes at the outer end being welded to ring 217 for support. Ring 219 serves as an oversized journal box for the rack journal 410 (see FIG. 3).

IIa.—The Air Duct System

Figure 5:
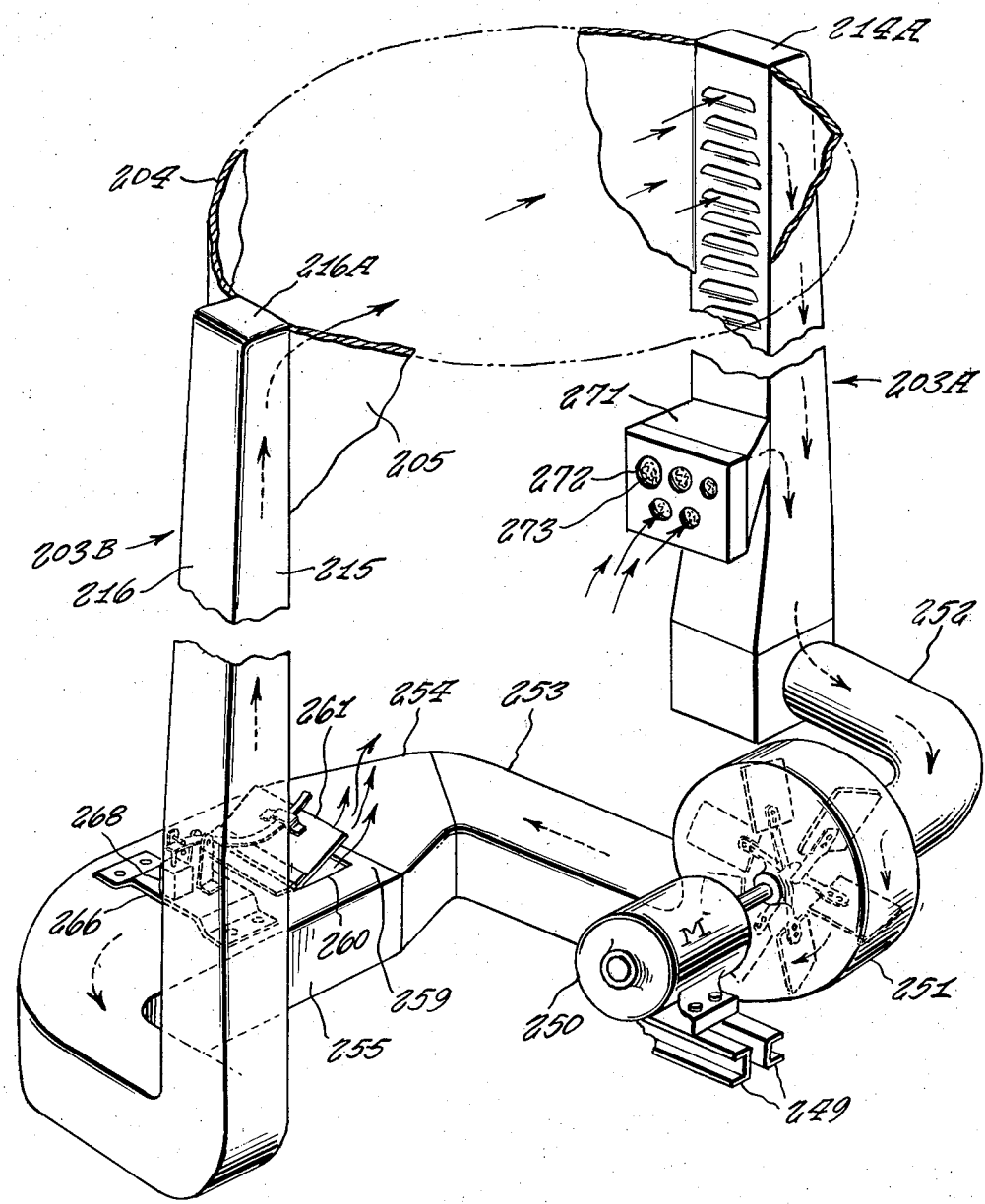
FIGURE 5 is a perspective view of the structure of the air duct system.

As seen in FIGS. 3–5, the air vents 208 in cylinder side wall 206 lead into duct 203A integrally attached to the cylinder. This duct is comprised of vertical end walls 213, connecting wall 214 and top wall 214A. The bottom of the duct is open and connects to the air duct system in the lower part of the machine.

Likewise duct 203B leading to vents 209 in cylinder side wall 207 is comprised of vertical end walls 215, connecting wall 216 and top wall 216A, and is open at the bottom and also connected to the air duct system aforementioned.

Included in this air duct system or circuit is a motor 250 (FIGS. 3, 4 and 5) supported on channels 249 attached to the main frame base. This motor drives an air blower 251 which forms part of the air drying system. An air duct 252 connected to the lower open end of vertical duct 203A leads to said blower 251. An air impeller in the blower forces the air into duct 253, then into expanded duct portions 254 and 255, the latter being provided with an 8 kw. booster heater 256 placed therein and leading into the lower end of vertical duct 203B. An opening 260 is provided in the top wall 259 of said duct 255 and covered by door 261 attached by hinge 262 to said top wall. A U-shaped handle 263 is attached to the top of the door near the edge opposite the said hinge. Also attached on top of duct portion 255 is a platform 266 upon which is mounted a solenoid 268 and fulcrum 267. Solenoid armature extension 269 is provided with a pair of pins 270 between which is held one end of a lever 264 which pivots on pin 265 in fulcrum 267, the other offset end of the lever passing through the loop of door handle 263.

Another duct 271 leading into the lower part of duct 203A permits entry of fresh air into the system from the lower chamber of the machine as seen in FIGURE 7. This duct is provided at its air receiving end with a series of openings 272 behind which is a filter 273 for the purpose of admitting dust-free air only.

Moreover, vertical duct 203A has a longitudinal 2 kw. standby heater 275 provided for heating the drawn air and has a central core 276 containing heating elements and heating radiating fins 277. Heater 275 is supported in the duct by bolts 278 fastened to duct wall portion 206 (FIG. 3).

Vents 209 in duct 203B are designed in specific dimension and shape toward the control of both the volume of air entering the cylinder and the direction thereof. Specifically shaped baffle elements 225 as seen in FIGURE 28 are attached inside duct 203B to wall 207 adjacent the openings 209 to accomplish this control and direction whereby said vents are each aligned to blow air to each of the tiers of X-ray film as will hereinafter be more fully described. However, it can now be stated that duct air is forced across both the upper and lower sides of the X-ray film by reason of the removable mounting of the film frame in the inclined channels 416 of the rack unit 400 (see FIG. 15) for tilted position so that when said rack unit is rotated about its vertical axis, both sides of the film are exposed to the air stream during each revolution of the rack unit.

Attached to one of the spokes 218 of the ring 219 serving as a spaced bearing for the upper journal of rack unit 400 is a micro-switch 218' as seen in FIGS. 12–14 to stop machine operation in the event that the rack latching mechanism 500 (to be described later) is improperly left unlocked at the time the machine is started to operate. Thus, attached to spoke 218' is a block 281 to which a plate 282 is fastened such as by screws 283. Fixed to said plate is a support 284 to which is fastened a bracket 285 carrying a latch control switch 280 and secured together as by screws 286. Extending from each side wall of support 284 is one of a pair of pins 287 from which pivot a depending plate 288 having side ears 289 provided with openings 290 engaging said pins. Rigidly attached to one side ear 289 of said plate is a wire tail 291 the end of which passes under lever 292 of the switch. As shown in FIGURE 14, should the latch mechanism 500 be accidently left fully or even partly unlocked (as illustrated by full and also in phantom lines in FIG. 21), the upstanding pin 530 on the rack assembly 400 will, upon start of rack rotation, strike depending plate 288 causing the same to rotate about pins 287 to cause tail 291 to lift lever 292 thereby breaking the electrical circuit and thus stop the machine operation.

When the latch mechanism 500 is properly and fully locked as shown in full lines in FIGURE 19, the pin 530 is in a horizontal position clear of the path of the plate 288.

(III) RACK SUSPENSION MOUNTING AND DRIVE THEREFOR

As seen in FIGURE 3, the rack unit 400 located inside therein by a supporting structure springably mounted and the cylinder 201 is freely and concentrically supported suspended in the lower chamber of the machine. Thus and as seen in FIGURE 4, the main frame 101 provides three anchor points on the same horizontal plane and radially spaced at 120 degrees for springable support of the rack suspension mounting and the drive therefor. Attached to said main frame 101 and at opposite corners are two horizontal angle beams 301 and 302 in such position as to provide place for two of the anchor points. Radially attached to said beams 301 and 302 and also to the front beam 105 of the main frame are three anchor plates 303 fastened thereto by screws 304 and disposed at 120 degrees from each other. As seen in FIGURE 6, a pair of openings 305 are provided in each plate into which one end of coil springs 310 are anchored. The other ends of the springs support the rack unit and the driving mechanism therefor about said three anchor points and by means of leaf-spring arms 313 extending from a central vertical cylindrical support 312 as seen in FIGURE 6.

The three horizontal leaf-spring arms 313 are spaced at 120 degrees and the outer ends are provided with suitable end structure 314 to which springs 310 may be fastened. The vertical cylindrical support 312 as best seen in FIGURE 9 consists of a sleeve 315 within which and at the upper and lower ends are ball bearings 316 and 317 for the support of shaft 318. Arms 313 are formed of flexible flat spring stock and so positioned as to permit torsion movement of sleeve 315 about its perpendicular axis. Thus, the inner ends of said arms are each welded integrally to the sleeve 315 while the outer ends are provided with end structures 314 riveted thereto, for receiving springs 310 as seen in FIGS. 6 and 8. These end structures are each composed of a U-shaped member 320 and fixed by rivets 321 to each of the arms 313 with electrical insulation 322 placed therebetween. U-shaped member 320 has a bridging bar 323 welded across its mouth into which two eye bolts 324 are rigidly secured as by nuts 325. Springs 310 are hooked into these eye bolts. On the underside of each plate 303 as best seen in FIGS. 6 and 8 is rigidly secured a centering device 326 having leaf springs 327 and 328, which hold captive therebetween the U-shaped member 320 in such a manner as to permit the vertical cylindrical support 312 to move radially in any horizontal direction, but which imposes a resistance that becomes stronger as the support 320 moves farther away from its normal central position. These centering devices are adapted to normally maintain the support 320 at its proper center while springs 310 permit movement of the support for a limited distance any direction in any plane.

Thus it is to be seen that the cylindrical support 312 is permitted a limited free movement with respect to the machine frame through flexible leaf spring arms 313, coil springs 310, and centering devices 326 for purposes of giving the rack unit axis yieldability to prevent stresses and strains due to unbalanced rack loading.

As best seen in FIGURE 26, a micro-switch 340 mounted on an extension 101A of the framework and powered by electric wires 341 is also included in the machine for the purpose of limiting the sway distance of the rack and supporting structure therefor. To prevent excessive swaying due to an extremely unbalanced position or loading of the rack, the lower edge of one of the arms 313 and designated 313' will strike the micro-switch lever 342, thus causing a break in the circuit and stopping the operation of the machine.

As best seen in FIGS. 3 and 4, a fixed pulley 329 is attached to rack shaft 318 and is provided with a belt 330 which engages a pulley 331, the latter being fixed on a clutch shaft 365 of a clutch mechanism 366. The case of this clutch mechanism is fixed to the housing of a spinner motor 333, and engagement between the clutch shaft 365 and motor shaft 332 is conventionally accomplished through the clutch mechanism. The clutch is of the centrifugal type providing engagement when the motor reaches a speed of approximately 1500 r.p.m. Motor 333 is suitably mounted by bolts 334 to one of the flexible arms 313 here designated as 313'. A flexible power cable 335 leads from the main frame to the motor for providing electrical power without in any way arresting the freedom of movement of the rack suspension unit. At the lower end of shaft 318 is a spin stop brake mechanism 175 supported on depending bracket 370, the latter being supported by angle bracket 371 to one of the spring arms 313. The spin stop brake mechanism is of the spring set magnetic release type and its purpose is to protect the operator against the coastally spinning rack in case of power failure. Moreover, this type of brake prevents rack rotation during the loading and unloading operations.

As seen in FIGS. 9 and 10 a bracket 336 with threaded openings 337 is fixed to the upper end of rack shaft 318. The rack unit 400 is supported on the shaft 318 as by screws 338 passing thru openings 339 in rack lower plate 401 and into threaded holes 337 of bracket 336. As seen in FIGS. 6, 7 and 9, the space between the rack support or bracket 336 and the lower center opening 212 in the cylinder bottom 210 is covered by a pliable or flexible member so as to seal the cylinder in an air tight and moisture proof manner from the lower chamber of the machine while at the same time not impairing the freedom of movements of the rack suspension in any direction. Thus, a cylindrical bellows-like structure of rubber herein designated as a diaphragm 345 having a series of circular or annular bellow folds 346 has an upstanding circular collar 347 at its upper end which fits snugly over the edges of a correspondingly circular metal collar 348 welded to the upper part of sleeve 315. A metal spring band 349 is clamped around the collar 347 for stronger security against separation. The band 349 is comprised of a split ring 350 with ends 351 and 352 bent outwardly at right angle and parallel to each other to form tabs, said tabs having opposing openings 353 through which is passed a bolt 354 fitted with nut 355. Band 349 being of shorter circumference than collars 347, tab ends 351 and 352 remain in spaced relation permitting tightening of bolt 354 to lock collar 347 tightly against collar 348. A similar structure is provided at the lower end of the bellows 345 where an upturned circular bellows collar 356 is fitted over the depending flange 211 of cylinder bottom 210 and a metal band 357 is placed therearound having the offset tab ends 358 with openings 360 and fitted with bolt 361 and nut 362.

Before leaving the discussion of the rack suspension, it is appropriate to here mention that the electrical insulation 322 as seen in FIGURE 6 has been provided in the present structure for safety purposes. In case any X-ray frame or holder should accidentally be thrown from its position in the rack during the operation of the machine (as described later), the holder being of metal will serve as an electrical contact between the insulated rack and the cylinder, thereby closing a circuit to open a switch for instantly stopping the operation of the machine and thereby to prevent subsequent damage to the mechanism.

(IV) THE RACK STRUCTURE

The rack unit as best seen in FIGS. 15 and 17 is an upright box-like structure comprised of a lower plate 401, an upper spaced and aligned plate 402 and four vertical and rigidly connecting angle beam posts 403, 404, 405 and 406 each suitably connected at the corresponding corners of the two plates, as by screws, welding etc. At the rear side of the rack (FIG. 3) there is a cross-work of rods 407 for the purpose of strengthening the rack structure. On the top side of upper plate 402 and at its center position is a bearing unit 410 for purpose of supporting the upper end of the rotatable rack unit 400.

Bearing unit 410 is held captive in ring 219 as has heretofore been mentioned to permit a limited amount of lateral and vertical movement of the rack unit thereby to steady same against excessive movement. This unit is comprised of a bracket 411 suitably affixed as by screws 412 to top rack plate 402. A rubber faced wheel 413 supported on ball bearings (not shown) is mounted on shaft 415 held by bracket 411. The wheel face is permitted to engage the inside face of ring 219 upon excessive movement.

Rack unit 400 is provided with a series of channels 416 serving as slots in which the edges of the X-ray film holders or frames are made to slide. These channels are placed on the two opposite sides of the rack and are spotwelded between posts 403 and 406 and also between posts 404 and 405. Said channels are mounted as seen in FIGURE 15 in off horizontal position for scanning of both sides of the film by a heated air stream as the rack rotates as will be more fully described hereinafter. A series of openings 417 are provided in the perpendicular connecting wall 418 of the channels to permit fluid from the surface of the film to be more readily discarded away from the rack during the centrifuging stage of said rack and also to permit penetration and exit of the heated air stream to blow against the edges and surfaces of the film during the drying stage as seen in FIGURE 24.

X-ray holders 421 are adapted to slide into the channel slots and to be mounted therein between the bottom and top walls thereof 419 and 420. Holder 421 is of the conventional type such as is presently available on the market, and comprises a square or rectangular metal frame, the front side or bar of which is formed of a channel 422 having projecting ends 423, the other three sides 424, 425 and 426 being formed by wire 427 bent into a three-sided shape and welded to the channel 422. One pair of film clips 428 are fixed to the rear side 425 of the frame while another pair of opposite film clips 429 are fixed to springs 430 welded to front bar 422 (see FIGS. 17 and 24).

It is to be noted that the forward end of channel slot top walls 420 are each cut-away to quickly and easily locate and place each film holder in a respective channel slot. Thus the holder 421 is actually dropped and admitted from above for introduction into the narrow slots. The forward edge 431 of channel top wall 420 is furthermore bent slightly upward for providing still easier admittance into the slot. The holder is pushed rearwardly until bar ends 423 meet posts 405 and 406. These posts are each provided with vertically aligned and spaced open slots 432 having mouths 433. An upstanding projection 434 having a rounded shoulder 435 forms the upper part of the slot forward wall adjacent the mouth.

During admission of a holder into the rack, the bar ends will normally abut the posts 405 and 406 at slot wall 434. At such time holder bar 422 is lifted slightly for passage of said bar ends over the curve of shoulders 435 whereupon the bar ends pass over the mouths 433 and are dropped into slots 432. It is to be noted that the forward cut-away portions of channel slot top walls 420 make possible the movement of the holder over the projection 434 as just described by providing clearance for the upward tilting of the forward portion of holder 421. Holder 421 carrying a film between clips 428 and 429 is thus locked inside slots 432 and is in position for machine drying thereof. However, this locking structure is not sufficiently secure to prevent the holder 421 from flying out of the opposite and complementary channel slots during the rapid rotation of the rack. Therefore a positive latching mechanism is provided.

(V) LATCHING MECHANISM

Latching mechanism 500 seen in FIGS. 18-23 is adapted to securely lock the X-ray film holders in the rack and prevent the holders from flying out of their emplacements due to the centrifuging phase of the rack rotation. This mechanism is secured to the top of rack plate 402 and is comprised of a pivoting block 501 composed of an upper plate 502 and a lower plate 503. Through said plates is a countersunk hole 504 having a pivot bolt 505 which passes therethrough and has a thread end engaging plate 402 (FIG. 18). Plates 502 and 503 are securely fixed together by pins 507. Open slots 508 and 509 are provided in plate 503 to admit entry therein of tongue elements 510, said tongues having openings (not shown) through which pins 507 penetrate, said pins serving as pivots for said tongues. Attached to these tongue elements are rods 512 and 513 each leading to clamping mechanisms to be hereinafter described at the front left and right corners of the rack (see FIGS. 18, 19, 20 and 21). Also provided in plate 502 is a longitudinal opening 514 serving as a free bearing for a shaft 515 having rigidly attached to one end a collar 516 provided with a radially disposed handle 517 (FIG. 18), the opposite end of shaft 515 having an enlarged diameter with the end portion 520 thereof milled away on the lower side 180 degrees to afford a flat bottom side 521. An arced bracket 522 is fastened rigidly as by screws to the upper side of top rack plate 402 and is provided with a horizontal upper surface 524 on which flat bottom side 521 of shaft portion 520 is free to slide when block 501 is in pivoting operation. An upwardly extending bracket projection 525 serves as an abutment for shaft portion 520 to limit the innermost position of the block's pivotal travel.

It is to be noted that while shaft end 515 is free to slide over surface 524 during block rotation, it is not free to be rotated in its bearing 514 during engagement with said surface. However, once block 501 is rotated to the position freeing shaft end 520 from bracket surface 524, said shaft becomes freely rotatable in bearing 514 (FIGS. 18-21).

Attached to shaft 515 adjacent end 520 and extending radially therefrom is a rubber surfaced pin 530 extending vertically while shaft end 520 is in slideably engaging position with bracket surface 524. This is the normal position of pin 530 when the latching mechanism is in unlocked position. However, after shaft end 520 is cleared of said surface end, the shaft 515 is pivoted downwardly for locked latch position, the pin will assume the horizontal position 530a shown in phantom lines in FIGURE 18. As has heretofore been noted, the electrical circuit for rotation of rack unit 400 is broken should the latching mechanism be or become unlocked by reason of pin 530 engaging microswitch 280 for opening said circuit.

To securely lock the rack unit for operation, handle 517 is moved from the solid position shown to the horizontally displaced phantom position 517a and thence to the downwardly pivoted phantom position 517b as seen in FIGURE 18. In this manner, the latching mechanism is brought from unlocked to locked position, the actual locking of the X-ray holders or frames 421 being accomplished by the motion transmitted through rods 512 and 513 to the damping mechanisms as will be described. The unlocking operation is in reverse sequence and direction as above described and can be seen by viewing FIGS. 20, 19 and 21 in the order mentioned.

Rotative movement of shaft 515 is limited by stop pins shown in FIGS. 18, 19 and 21 and in greater detail in FIGS. 39-41. Thus, when the latching mechanism is in intermediate and unlocked position and beyond bearing surface 524 shown in FIGURE 40, a radial stop pin 531 slideably bears against the upper plate 402 of the rack unit preventing the operator from rotating shaft 515 upwardly thereby limiting rotational movement in the proper direction. In the fully locked position, shaft 515 is limited against further movement by a radial stop pin 532 mounted on shaft end 520 which is adapted to strike against the stop post 533 mounted on block 501 and set in the path of movement of stop pin 532.

To prevent unlocking of the latch mechanism by vibration and centrifugal forces during rotation of the rack unit 401, a detent is also incorporated into the latching device. Thus, a detent 534 is mounted radially on shaft end 520 which is engageable with a dimple 535 on rack unit upper plate 402 when the shaft 515 of the latching mechanism is in locked position. Only manual force by the operator on handle 517 is required to overcome such engagement to open the latch.

*Va.—Clamping Mechanisms Operative by Latching Means*

Clamping mechanisms 540 and 541 operative by latching assembly 500 are each located along the front edges of rack unit 400 and connected to the above described latching mechanism by rods 512 and 513 respectively. Fastened rigidly to each of the rack posts 405 and 406 are a series of spaced and aligned bearing blocks 542 in which a shaft 543 is freely held (see FIGS. 15–17). One end of a crank 544a is rigidly fixed to the top of shaft 543 by a pin 545, the said crank being spaced from the uppermost bearing block 542 by a free sleeve or spacer 546.

At the opposite and swinging end of crank 544a is a vertically disposed retaining or locking shaft 548 for the film holders 421, said shaft penetrating the said crank and similar cranks below as 544b and 544c through openings 547. Lower cranks 544b and 544c, similarly secured to shaft 543 by pins 545, are additionally provided with pins 549 for rigid connection with retaining shaft 548 to prevent vertical shaft movement.

For purposes of pivotal connection with the operating rods 512 and 513 of the clamping mechanism, each crank 544a is provided with an open slot 550 which receives a tongued element 551 having an opening 552 penetrated by retaining shaft 548, said tongued element being screw connected to the corresponding rod ends 512 and 513 which lead to the latch mechanism as best seen in FIGURE 17.

As shown in FIGS. 15 and 16, retaining shaft 548 extends along the full vertical distance between the uppermost and lowermost rack unit slots 432 in order to bear locking pressure when in operative position against the channel side ends 423 of one or more of the X-ray film holders 421. Thus and as shown in FIGURE 23, film holder 421 has just been introduced into the rack unit 400 and channel 422 thereof has been dropped into slots 432. For such operation, retaining shaft is in outwardly swung position to permit said introduction. Upon movement of handle 517 of the latch assembly from the position as shown in FIGURE 21 to the position 517a shown in phantom in the same figure, retaining shaft 548 is moved from the position shown in FIGURE 23 to the position shown in FIGURE 22, through the linkages above described.

As seen in FIGURE 23 and for closed position of latching assembly 500 and clamping mechanisms 540 and 541, each of the retaining shafts 548 bears against the projecting ends 423 of film holder channels 422 and locks them against walls 436 of slots 432 as best illustrated in FIGURE 16.

*Vb.—Over-Riding Mechanism to Maintain Open and Closed Clamping Position*

In the clamping mechanisms 540 and 541 and the latch assembly 500 may be provided an over-riding mechanism to maintain selected open or locked positions thereof against accidental displacements. Such mechanism 560 as shown in FIGS. 19–21 is adapted to be operative on either of the clamping mechanisms 540 and 541 and to retain them in preselected position.

More specifically, a post 561 is secured to the upper face of top plate 402 of the rack unit 400, said post having a slot 562 milled therethrough for movable penetration of one end of a movable pin shaft 563. The uppermost crank 544a on shaft 543 of clamping mechanism 541 is substituted by a bell crank 544d pivoting on shaft 543 and has one swinging arm 564 operative on retaining shaft 548 and another swinging arm 565. The latter carries a pin 566 penetrating an adapter plate 568 through an opening 567 between arm 565 and plate 568. The opposite end of pin shaft 523 is mounted in adapter plate 568.

A washer 569 is mounted on pin shaft 563 and is disposed adjacent a face of adapter plate 568 while another washer 570 is movably mounted on said pin shaft and is biased against post 561 by a shaft surrounding coil compression spring 571 operative and mounted between said washers.

In operation, during movement of bell crank 544, shaft pin 566 describes an arc and in the middle of its travel meets with increased resistance due to added compression of spring 571. After overriding this middle position in either direction, the spring force urges bell crank 544d to maintain its position at the respective end of its direction of travel.

MODE OF OPERATION AND INCIDENTAL DETAILS

Attention is now directed for describing mode of operation to FIGURES 1 and 2 showing the working panel 150, and FIGURE 34 showing the timer.

On the closing of the main line switch 151 connected to a 230 volt 60 cycle line, a green light 155 on panel 150 is energized to indicate that the machine is in operation. In addition, the lamp 160 over the panel 150 and lamp 161 over the doorway 113 (see FIG. 33) are energized as well as one of the lamps inside the cylinder 201 such as 220 or 221. The heater 275 is energized at one-half wattage to provide a minimum starting temperature of 200 degrees F. When such temperature has been attained, an amber light 156 is energized indicating that the machine is sufficiently warmed up.

Cylinder door 113 is now opened for purposes of loading the rack unit 400 at which time a spin stop magnetic brake 175 operates to hold the rack unit fairly stationary during the loading or unloading operation. If necessary, the rack unit may be rotated by hand so that latch handle 517 will be accessible and suitable for manipulation so that the latch mechanism is in open position. For open position of the latch mechanism, latch handle 517 must be in horizontal and in maximum clock-wise position whereat shaft end 520 abuts projection 525 and is there maintained by the overriding mechanism shown in FIGURE 19 as heretofore described. Holders 421 containing developed, fixed and rinsed X-ray films are now loaded into the rack unit 400. Films of different sizes are preferably loaded alternately instead of in groups to prevent unbalancing the suspended rack structure. Moreover, the rack unit may be loaded in the rear to prevent unbalancing. The latching mechanism is then locked by horizontal movement of handle 517 in the opposite direction until a clicking is heard owing to operation of said overriding mechanism, and then handled 517 is rotated in a downward direction. Thereafter the door 113 is slammed shut.

The starting button 152 in FIGS. 35 and 2 is then depressed and makes contact with suitable interconnected timing motors associated with a timer 154 through a suitable thermostatic control. One of the timer motors operates to control the spinning time and the other to control heating and blowing. The interconnected timers control all operations in proper sequence and further permits manual adjustment of time phases during the drying cycle as is conventionally known.

First the spinner motor 333 goes on at full speed causing the rack unit 400 to rotate at between 400 and 500 r.p.m. A red light 157 is energized to indicate that spinning operation is in progress. Rack unit 400 thus rotates at high speed and is driven for one-half minute after which the speed is reduced by motor-speed reduction by a holding circuit to 20 r.p.m. for the balance of full drying cycle.

During the first minute of operation, approximately 92 percent of the fluid is removed from the film by centrifuge, said fluid being thrown to the smooth sides of the cylinder 201 and is drained through the tube 230 into a bucket.

For the first 30 seconds of operation, spinning motion is at 400 r.p.m., and there is no operative blower and no booster heat. In the second 30 seconds, the blower goes on, the booster heater goes on and at the same time the cage speed is reduced to 20 r.p.m.

At the start of the second minute, both blower motor 250 are on as well as booster heater 256 as above stated. In this way, hot air is moved through the duct system and is maintained at a temperature of 200 degrees F. A suitable thermostat is used to cut off booster heater 256 in the event that the blower motor 150 fails to operate. The channels 416 supporting the X-ray film holders and having the series of openings 417 therein permit the hot air to reach all the edges and surfaces of the films including the clips for drying the entire surfaces. The angulated position of the film during spin drying as well as during hot air convection movements makes possible the thorough drying not only of the film area but also the drying of the clips 428 and 429 as seen by the positioning of channels 417.

At the beginning of the second minute, the temperature goes up to 200 degrees F. and the cage spinning is at 20 r.p.m. These conditions continue for the balance of the cycle except that at 60 seconds prior to the end of the cycle, booster 256 is shut off, vent 260 in the duct system opens and thereby permits moisture-laden air to be thrown out into the lower chamber and the temperature of the cage is reduced for handling. The blower 251 draws in cool outside air through the filters 273 and the temperature is thus gradually reduced.

A stop button 153 is provided on the control panel 150 and is used for stopping the machine in case of emergency. This button interrupts circuit and energizes the magnetic brake 175.

Although a circuit diagram is not shown, the system is adequately protected by fuses, and by thermostats. As has been mentioned, a thermostat controls energization of amber light 156 and the two timer motors when minimum temperature in the cylinder 150 is attained.

At the end of the cycle, the duct system vent closes. During the final minutes of the cycle, the remainder or 8 percent of moisture has been dried and at end of the cycle the second light 220 or 221 inside cylinder 201 goes on. The solenoid 138 over the door 113 retracts and permits opening of the door and removal of the holders 421 from the rack unit 400 after the latch is swung in the open and above described position. All the above sequences of operation as has been mentioned are controlled by the timer 154 having two interconnected motors M3 and M4 (FIG. 2).

The moisture in cylinder 201 as above stated falls onto the bottom wall 210 and is removed. The air filter and the duct system should be attended to and when too full of dust should be replaced. The volume of air intake is controllable as well as the humidity of the air. Continuation of the cycle after stop button 153 is depressed for any reason is accomplished by pressing the start button 152.

It is understood that minor variations in procedure and structure including integration of assemblies and subassemblies, size, shape, material and integration of parts may all be resorted to without departing from the spirit of the invention and the scope of the appended claims.

Having thus described my invention, I claim as new and desire to secure by Letters Patent:

1. In a film drying apparatus comprising in combination, a main chamber, a rack supported within said chamber for rotation about a vertical axis, said rack having a plurality of spaced holders each for each of the films to be dried, the chamber having air stream nozzles along one side and parallel with said holders for directing air streams along opposite surfaces of the films, the chamber also having exhaust outlets opposite to and corresponding with the respective positions of said nozzles whereby respective air streams from the nozzles and laden with moisture from the films are removed from the chamber by said outlets, the said spaced holders being disposed in planes offset from the horizontal plane.

2. In a film drying apparatus comprising in combination, a main chamber, a rack supported within said chamber for rotation about a vertical axis, said rack having a plurality of spaced holders each for each of the films to be dried, the chamber having air stream nozzles along one side and parallel with said holders for directing air streams along opposite surfaces of the films, the chamber also having exhaust outlets opposite to and corresponding with the respective positions of said nozzles whereby respective air streams from the nozzles and laden with moisture from the films are removed from the chamber by said outlets, the said spaced holders being disposed in planes offset form the horizontal plane, opposite ducts secured to the outer walls of said chamber, one of said ducts having an airflow to feed said nozzles and the other of said ducts being under negative pressure and being in communication with and operative on said outlets, said ducts having heating means for air temperature control.

References Cited in the file of this patent

UNITED STATES PATENTS

| | | |
|---|---|---|
| 1,260,122 | Anderson | Mar. 19, 1918 |
| 1,756,197 | Hopkins | Apr. 29, 1930 |
| 2,120,471 | Peters et al. | June 14, 1938 |
| 2,386,591 | Campbell | Oct. 9, 1945 |
| 2,552,322 | Jennings | May 8, 1951 |
| 2,755,716 | Epstein | July 24, 1956 |
| 2,859,536 | McEwen | Nov. 11, 1958 |